(12) United States Patent
Mansour et al.

(10) Patent No.: US 10,677,915 B2
(45) Date of Patent: Jun. 9, 2020

(54) SYSTEM AND METHOD FOR FUSED RADAR IMAGING UNDER POSITION AMBIGUITY OF ANTENNAS

(71) Applicant: Mitsubishi Electric Research Laboratories, Inc., Cambridge, MA (US)

(72) Inventors: Hassan Mansour, Boston, MA (US); Ulugbek Kamilov, Cambridge, MA (US); Dehong Liu, Lexington, MA (US); Petros Boufounos, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 304 days.

(21) Appl. No.: 15/890,456

(22) Filed: Feb. 7, 2018

(65) Prior Publication Data
US 2019/0242991 A1    Aug. 8, 2019

(51) Int. Cl.
*G01S 13/90* (2006.01)
*G01S 7/295* (2006.01)
(Continued)

(52) U.S. Cl.
CPC .............. *G01S 13/90* (2013.01); *G01S 7/295* (2013.01); *G01S 7/40* (2013.01); *G01S 13/003* (2013.01); *G01S 13/89* (2013.01)

(58) Field of Classification Search
CPC .... G01S 13/9011; G01S 13/904; G01S 13/90; G01S 13/89; G01S 7/40; G01S 13/9029;
(Continued)

(56) References Cited

U.S. PATENT DOCUMENTS

| | | | |
|---|---|---|---|
| 4,594,593 A | | 6/1986 | Nohmi |
| 4,617,567 A | * | 10/1986 | Chan ...................... G01S 13/90 342/196 |

(Continued)

OTHER PUBLICATIONS

B.L. Burns, J.T. Cordaro, "SAR image formation algorithm that compensates for the spatially variant effects of antenna motion", SPIE Proceedings, vol. 2230, SPIE's International Symposium on Optical Engineering in Aerospace Sensing, Orlando, Apr. 4-8, 1994, pp. 14-24. (Year: 1994).*

(Continued)

*Primary Examiner* — Olumide Ajibade Akonai
(74) *Attorney, Agent, or Firm* — Gennadiy Vinokur; James McAleenan; Hironori Tsukamoto

(57) ABSTRACT

Systems and methods for a radar system to produce a radar image of a region of interest (ROI). A set of antennas to transmit radar pulses to the ROI and to measure a set of reflections from the ROI corresponding to the transmitted radar pulses. A processor acquires an estimate of the radar image, by matching the reflections of the ROI measurements for each antenna. Determine a set of shifts of the radar image. Wherein each shift corresponds to an antenna, and is caused by an uncertainty in a position of the antenna. Update the estimate of the radar image, based on the determined set of shifts of the radar image. Wherein for each antenna, the estimate of the radar image is shifted by the determined shift of the radar image corresponding to the antenna, that fits the reflections of the ROI measurements of the antenna.

20 Claims, 17 Drawing Sheets

(51) Int. Cl.
*G01S 13/89* (2006.01)
*G01S 7/40* (2006.01)
*G01S 13/00* (2006.01)

(58) Field of Classification Search
CPC .... G01S 7/04; G01S 13/5242; G01S 13/9043; G01S 2007/2883; G01S 13/003; G01S 7/295; G01S 1/02; G01S 3/786
See application file for complete search history.

(56) References Cited

U.S. PATENT DOCUMENTS

| | | | | |
|---|---|---|---|---|
| 6,781,541 B1* | 8/2004 | Cho | | G01S 13/904 |
| | | | | 342/25 D |
| 6,970,128 B1* | 11/2005 | Dwelly | | G01S 13/904 |
| | | | | 342/25 F |
| 7,436,349 B1* | 10/2008 | Doerry | | G01S 13/904 |
| | | | | 342/25 A |
| 7,965,225 B1* | 6/2011 | Dickerson | | G01S 7/4026 |
| | | | | 342/73 |
| 8,102,299 B2 | 1/2012 | Young et al. | | |
| 8,134,490 B2 | 3/2012 | Gebert et al. | | |
| 8,208,131 B2 | 6/2012 | Schilling et al. | | |
| 10,042,049 B2* | 8/2018 | Bergeron | | G01S 13/9005 |
| 10,473,755 B1* | 11/2019 | Doerry | | G01S 13/90 |
| 2008/0042893 A1* | 2/2008 | Connell | | G01S 13/9011 |
| | | | | 342/25 F |
| 2016/0170019 A1* | 6/2016 | Owirka | | G01S 13/9029 |
| | | | | 342/25 B |
| 2017/0146651 A1 | 5/2017 | Liu | | |

OTHER PUBLICATIONS

Ma Lun et al., "Maximum total variation autofocus algorithm for SAR imaging," International Journal of Digital Content Technology and its Applications, vol. 6, No. 12, Jul. 15, 2012. pp. 334-341.

Onhon et al., "A Sparsity Driven Approach for Joint SAR Imaging and Phase Error Correction," IEEE Transactions on Image Processing. vol. 21, No. 4, Apr. 1, 2012. pp. 1057-7149.

Wang et al., "Blind Deconvolution from Multiple Sparse Inputs," IEEE Signal Processing Letters, vol. 23, No. 10, Oct. 1, 2016. pp. 1384-1388.

Önhon et al., "A Sparsity-Driven Approach for Joint SAR Imaging and Phase Error Correction." IEEE Transactions on Image Processing ( vol. 21, Issue: 4, Apr. 2012 ). IEEE Signal Processing Society, Dec. 9, 2011, pp. 2075-2088.

Wang et al., "Antenna motion errors in bistatic SAR imagery." IOP Publishinv, Inverse Problems, 31 (2015) 065001 (28pp). 0266-5611/15/065001+28$33.00 © 2015 IOP Publishing Ltd Printed in the UK.

Yang et al., "Compressed Sensing Radar Imaging With Compensation of Observation Position Error." IEEE Transactions on Geoscience and Remote Sensing, vol. 52, No. 8, Aug. 2014. pp. 4608-4620.

Bilen et al., "Convex Optimization Approaches for Blind Sensor Calibration using Sparsity," IEEE Transactions on Signal Processing 62, 18 (2014) 4847-4856. arXiv:1308.5354.

* cited by examiner

160 — Measuring, using a set of antennas at different positions to transmit radar pulses to a region of interest (ROI) and a set of reflections from the ROI corresponding to the transmitted radar pulses 165 — Acquiring an estimate of the radar image, by matching the reflections of the ROI measurements of each antenna from the set of antennas 170 — Determining a set of shifts of the radar image, such that each shift from the set of shifts corresponds to an antenna from the set of antennas, and is caused by an uncertainty in a position of the antenna 175 — Updating the estimate of the radar image, based on the determined set of shifts of the radar image, such that for each antenna, the estimate of the radar image is shifted by a determined shift of the radar image corresponding to the antenna from the set of antennas, that fits the reflections of the ROI measurements of the antenna 180 — Outputting, via an output interface, the radar image from the updated estimate of the radar image

FIG. 1A

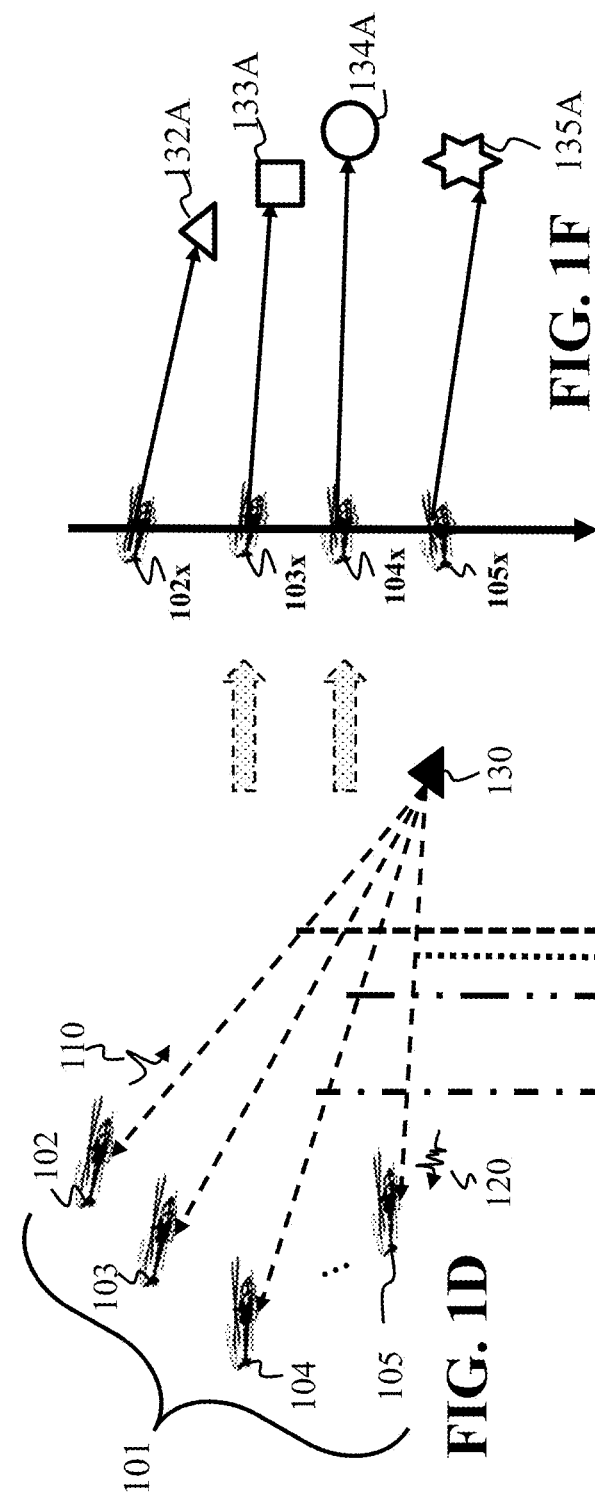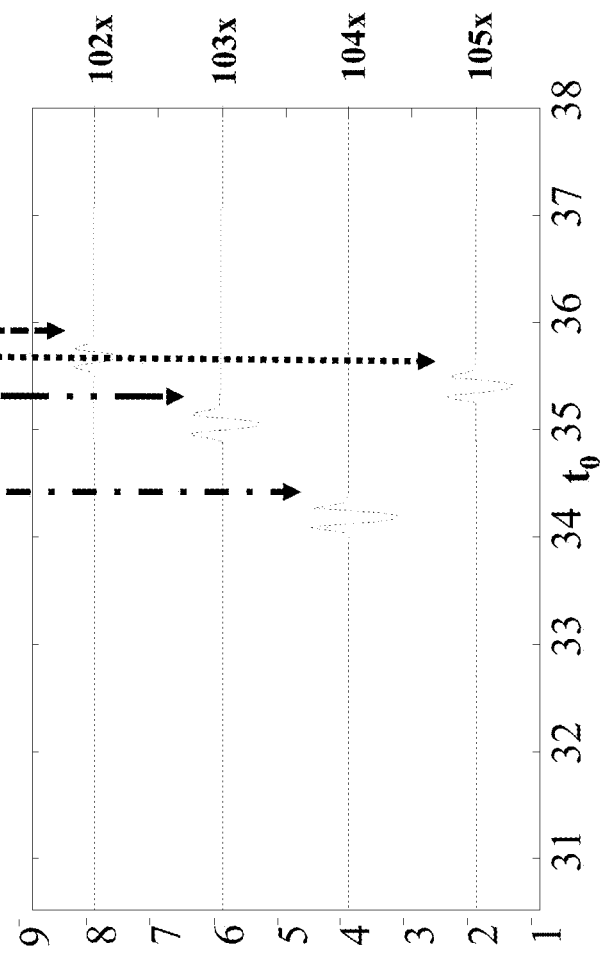

SYSTEM AND METHOD FOR FUSED RADAR IMAGING UNDER POSITION AMBIGUITY OF ANTENNAS

FIELD

The present disclosure relates generally to radar systems, and more particularly radar imaging by fusing measurements of various antennas having unknown position perturbations.

BACKGROUND

High resolution radar imaging is a requirement in a variety of remote sensing applications including synthetic aperture radar (SAR) and through-the-wall radar imaging (TWI). Whereas the down-range resolution is mostly controlled by the bandwidth of the transmitted pulse, the cross-range (azimuth) resolution depends on the aperture of the radar array. Generating a large physical aperture is practically achieved by deploying a number of distributed antennas or arrays, each having a relatively small aperture. A distributed setup allows for flexibility of platform placement, reduces the operational and maintenance costs, and adds robustness to sensor failures. Leveraging prior knowledge of the scene, such as sparsity, the precise knowledge of the antenna positions and a full synchronization of received signals has been shown to significantly improve the radar imaging resolution.

Some challenges in radar imaging using distributed sensing is being able to identify locations of antennas due to inaccurate calibration or various position perturbations. Although modern navigation systems such as the Global Positioning System (GPS) can measure positions, the possible position errors due to position perturbations are beyond the scope of high-resolution distributed radar imaging. For example, for a vehicle mounted radar system, as the vehicle is moving along some predesigned trajectory, position perturbations are introduced due to non-smooth road surface or varying driving velocity and direction. These position perturbations can be as large as several wavelengths of the radar center frequency. Consequently, applying standard reconstruction techniques without accounting for the position perturbation produces out-of-focus radar images.

There have been a multitude of solutions that addressed the radar autofocus problem, particularly in the SAR setting, by developing tools that compensate for the antenna position errors. Unfortunately, this problem is ill-posed and solving this problem is a computationally demanding process with difficult to find solution. To that end, some methods impose additional constraints on the autofocusing problem to make this problem tractable. See, e.g., U.S. Pat. No. 8,009,079. Those additional constraints are not always desirable.

Therefore, there is a need for radar imaging systems and methods for autofocusing of distributed antennas having unknown position perturbations.

SUMMARY

Embodiments of the present disclosure relate to systems and methods for radar imaging by fusing measurements of various antennas having unknown position perturbations.

For example, some embodiments of the present disclosure are based on the recognition that radar autofocus problems of distributed antennas with position ambiguities that can be an ill-posed problem with a vast number of unknowns. Specifically, when the radar autofocus problem is formulated as determining a radar image from the measurements related to the radar image through a radar operator having uncertainties encoding the position ambiguities, each measurement of a region of interest (ROI) of the radar system includes an error caused by the position ambiguities. Moreover, due to non-linearity of relationships between the measurements and the errors in the positions of the antennas, each sample of the measurements from the same antenna can have a different error, thereby increasing a number of unknowns in the model of the radar autofocus problem formed by multiple measurements from multiple antennas. To that end, that formulation of the radar autofocus problem aims to recover the correct radar image from incorrect measurements caused by the incorrect radar operator, which is difficult.

Some embodiments of the present disclosure are based on realization that the radar autofocus problem can be reformulated as recovering an incorrect radar image from correct measurements and correct radar operator. On one hand, such a reformulation does not make sense. However, some embodiments realize that the incorrect radar image determined via such a formulation of the radar autofocus problem can relate to the correct radar image through a linear shift. Due to this linearity, each sample of the measurements from the same antenna represents the correct radar image with the same linear shift. Of course, measurements of different antennas correspond to different shifts of the correct radar image, but, still, the present disclosure formulation can significantly reduce the number of unknowns in the radar autofocus problem allowing to use different techniques to solve this problem in an efficient manner.

For example, some embodiments, instead of trying to fix the measurements of the antennas, use those measurements to find a shift of the radar image for each antenna and to find the radar image itself, such that, for each receiver, the radar image shifted with the corresponding shift fits the measurements of the receiver.

Further, some embodiments are based on recognition that the shifts and the radar image can be found using alternating optimization. For example, one embodiment determines the set of shifts and the radar image iteratively using alternating optimization, until a termination condition is met. For example, the embodiment updates the radar image while fixing set of shifts and updates the set of shifts while fixing the radar image.

Other embodiments are based on realization that because the new formulation reduces the number of unknowns in the radar autofocus problem, different regularizations can be used to make the radar autofocus problem well posed. For example, some embodiments use a fused Lasso regularization including a one norm of the radar image and a total variation (TV) norm of the radar image. The one norm term imposes the sparsity on the radar image, while TV norm reduces the noise in the radar image. However, other embodiments use different regularizations. It is possible that some embodiments of the present disclosure can use a regularization term to impose sparsity on the shift kernel to reduce blurring in the radar image.

Some embodiments combine alternating optimization with the use of the regularizations to further streamline the fusing of the radar image. For example, in one embodiment, the measurements of each antenna are modeled as a product of the radar operator defining the position of the antenna including the uncertainty, the radar image, and the shift of the antenna to produce modeled measurements. This embodiment, for each iteration of the alternating optimization, updates the radar image by minimizing a difference between the measurements and the modeled measurements combined with a fused Lasso regularization including a one norm of the radar image and a total variation (TV) norm of the radar image, and updates the shifts of the radar image by solving a sparse recovery problem minimizing a difference between the measurements and the modeled measurements with the updated radar image combined with a one norm of the shifts enforcing a single non-zero entry in the updated shifts. Further, aspects of the present disclosure address technical clarifications on processes of shifting an image to compensate for uncertainties in antenna positions. Wherein, the present disclosure addresses the formulation of the problem with multiple antennas to solve an auto-focus problem. Also, at least one aspect of the present disclosure, can include a special case when all antennas are transmitting and receiving, such that the present disclosure makes possible to recover a location of an antennas. Wherein the present disclosure also presents other approaches to this problem that aim to explicitly recover an antenna position error, among other things.

According to an embodiment of the present disclosure, a radar system for to produce a radar image of a region of interest (ROI). The radar system including a set of antennas at different positions to transmit radar pulses to the ROI and to measure a set of reflections from the ROI corresponding to the transmitted radar pulses. Wherein each antenna includes reflections of the ROI measurements specific to the antenna. A hardware processor configured to acquire an estimate of the radar image, by matching the reflections of the ROI measurements of each antenna from the set of antennas. Determine a set of shifts of the radar image. Such that each shift from the set of shifts corresponds to an antenna from the set of antennas, and is caused by an uncertainty in a position of the antenna. Update the estimate of the radar image, based on the determined set of shifts of the radar image, such that for each antenna, the estimate of the radar image is shifted by the determined shift of the radar image corresponding to the antenna from the set of antennas, that fits the reflections of the ROI measurements of the antenna. An output interface rendering the radar image from the updated estimate of the radar image.

According to another embodiment of the present disclosure, a method for a radar system to produce a radar image of a region of interest (ROI). The method including measuring, using a set of antennas at different positions to transmit radar pulses to the ROI and a set of reflections from the ROI corresponding to the transmitted radar pulses. Wherein each antenna includes reflections of the ROI measurements specific to the antenna. Using a hardware processor in communication with the transmitter and set of antennas and a memory. The hardware processor is configured for acquiring an estimate of the radar image, by matching the reflections of the ROI measurements of each antenna from the set of antennas. Determining a set of shifts of the radar image, such that each shift from the set of shifts corresponds to an antenna from the set of antennas, and is caused by an uncertainty in a position of the antenna. Updating the estimate of the radar image, based on the determined set of shifts of the radar image, such that for each antenna, the estimate of the radar image is shifted by a determined shift of the radar image corresponding to the antenna from the set of antennas, that fits the reflections of the ROI measurements of the antenna. Outputting, via an output interface, the radar image from the updated estimate of the radar image.

According to another embodiment of the present disclosure, a radar system for to produce a radar image of a region of interest (ROI). The radar system including a set of antennas at different positions to transmit radar pulses to the ROI and to measure a set of reflections from the ROI corresponding to the transmitted radar pulses. Wherein each antenna includes reflections of the ROI measurements specific to the antenna. Hardware processor configured to acquire an estimate of the radar image, by matching the reflections of the ROI measurements of each antenna from the set of antennas. Determine a set of shifts of the radar image. Such that each shift from the set of shifts corresponds to an antenna from the set of antennas, and is caused by an uncertainty in a position of the antenna. Update the estimate of the radar image, based on the determined set of shifts of the radar image. Such that for each antenna, the estimate of the radar image is shifted by the determined shift of the radar image corresponding to the antenna from the set of antennas, that fits the reflections of the ROI measurements of the antenna. Wherein determining the set of shifts of the radar image and updating the estimate of the radar image, is based on the set of shifts of the radar image that is iterated until a termination condition is met. An output interface rendering the radar image from the updated estimate of the radar image.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a block diagram illustrating steps of a method, according to embodiments of the present disclosure;

FIG. 1D and FIG. 1E are schematics, when viewed together, illustrate distortion that affects the measured time domain signal of each antenna due to the error in the antenna position, when measuring the reflection of a single target, according to embodiments of the present disclosure;

FIG. 1F is a schematic illustrating the mapping between a set of antennas having perturbed positions and measuring the reflection of a single target to a set of antennas having uniform linear positions and measuring shifted versions of the same target, according to embodiments of the present disclosure;

Figure 1B:
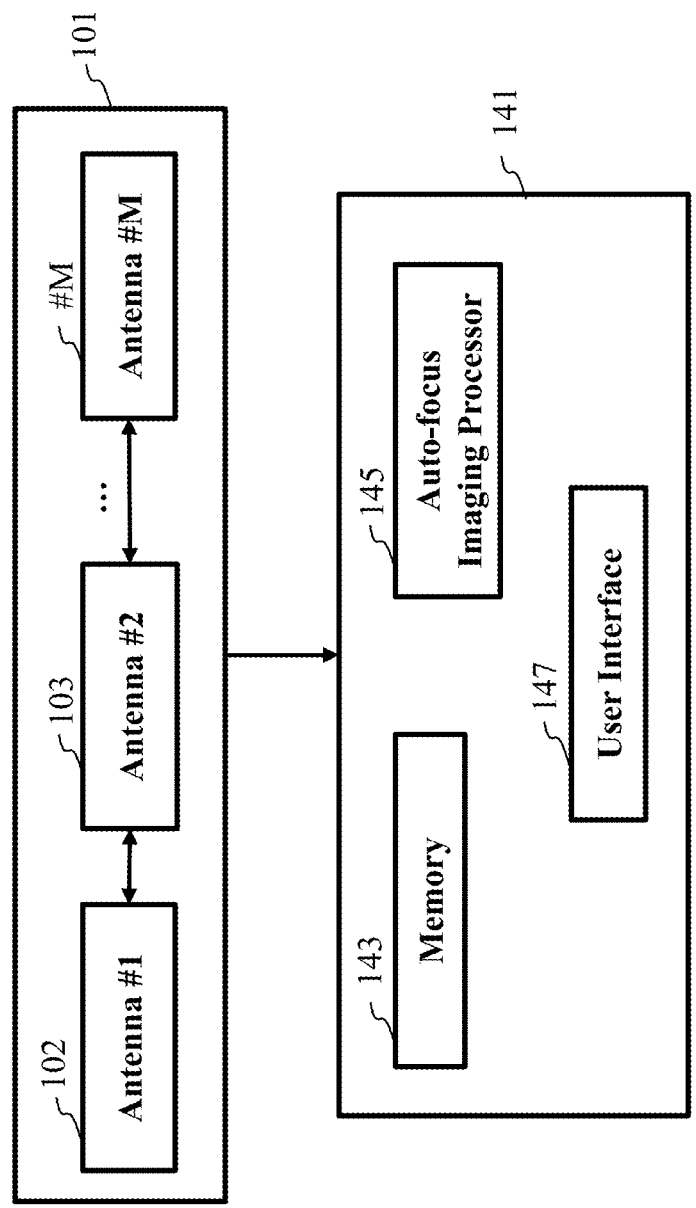
FIG. 1B is a block diagram illustrating some components implementing the method of FIG. 1A, according to embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Overview

Embodiments of the present disclosure relate to systems and methods for radar imaging by fusing measurements of various antennas having unknown position perturbations. For example, the present disclosure is based on the recognition that radar autofocus problems of distributed antennas with position ambiguities can be an ill-posed problem with a vast number of unknowns. Specifically, when the radar autofocus problem is formulated as determining a radar image from the measurements related to the radar image through a radar operator having uncertainties encoding the position ambiguities, each measurement of a region of interest (ROI) of the radar system includes an error caused by the position ambiguities. Moreover, due to non-linearity of relationships between the measurements and the errors in the positions of the antennas, each sample of the measurements from the same antenna can have a different error, thereby increasing a number of unknowns in the model of the radar autofocus problem formed by multiple measurements from multiple antennas. To that end, that formulation of the radar autofocus problem aims to recover the correct radar image from incorrect measurements caused by the incorrect radar operator, which is difficult.

Some embodiments of the present disclosure are based on realization that the radar autofocus problem can be reformulated as recovering an incorrect radar image from correct measurements and correct radar operator. On one hand, such a reformulation does not make sense. However, some embodiments realize that the incorrect radar image determined via such a formulation of the radar autofocus problem can relate to the correct radar image through a linear shift. Due to this linearity, each sample of the measurements from the same antenna represents the correct radar image with the same linear shift. Of course, measurements of different antennas correspond to different shifts of the correct radar image, but, still, the present disclosure formulation can significantly reduce the number of unknowns in the radar autofocus problem allowing to use different techniques to solve this problem in an efficient manner.

For example, some embodiments, instead of trying to fix the measurements of the antennas, use those measurements to find a shift of the radar image for each antenna and to find the radar image itself, such that, for each receiver, the radar image shifted with the corresponding shift fits the measurements of the receiver.

Further, some embodiments are based on recognition that the shifts and the radar image can be found using alternating optimization. For example, one embodiment determines the set of shifts and the radar image iteratively using alternating optimization, until a termination condition is met. For example, the embodiment updates the radar image while fixing set of shifts and updates the set of shifts while fixing the radar image.

Other embodiments are based on realization that because the new formulation reduces the number of unknowns in the radar autofocus problem, different regularizations can be used to make the radar autofocus problem well posed. For example, some embodiments use a fused Lasso regularization including a one norm of the radar image and a total variation (TV) norm of the radar image. The one norm term imposes the sparsity on the radar image, while TV norm reduces the noise in the radar image. However, other embodiments use different regularizations. It is possible that some embodiments of the present disclosure can use a regularization term to impose sparsity on the shift kernel to reduce blurring in the radar image.

Some embodiments combine alternating optimization with the use of the regularizations to further streamline the fusing of the radar image. For example, in one embodiment, the measurements of each antenna are modeled as a product of the radar operator defining the position of the antenna including the uncertainty, the radar image, and the shift of the antenna to produce modeled measurements. This embodiment, for each iteration of the alternating optimization, updates the radar image by minimizing a difference between the measurements and the modeled measurements combined with a fused Lasso regularization including a one norm of the radar image and a total variation (TV) norm of the radar image, and updates the shifts of the radar image by solving a sparse recovery problem minimizing a difference between the measurements and the modeled measurements with the updated radar image combined with a one norm of the shifts enforcing a single non-zero entry in the updated shifts.

FIG. 1A is a block diagram illustrating some steps of a method, according to embodiments of the present disclosure. At least one system and method 100A, can begin with step 160, that includes measuring, using a set of antennas at different positions to transmit radar pulses to a region of interest (ROI) and a set of reflections from the ROI corresponding to the transmitted radar pulses. Wherein each antenna includes reflections of the ROI measurements specific to the antenna. The set of radar reflections can correspond to a transmitted signal from a transmitter directed toward the ROI or from some of the antennas in the set of antennas. The set of radar reflections or reflections can be stored in a memory of processor for each receiver and communicated to a central controller for processing.

Step 165 of FIG. 1A can include a hardware processor acquiring an estimate of the radar image, by matching the reflections of the ROI measurements of each antenna from the set of antennas by minimizing a difference between the measured radar reflections and a set of modeled measurements synthesized from the transmitted pulses, the estimate of the radar image, and the estimates of the image shifts.

The coarse positions of the set of antennas can be given by real-time GPS signals or by pre-designed stationary positions or moving trajectories. The radar receivers can be stationary or moving along a pre-designed trajectory, and the effective position of each radar receiver where pulse reflections are received forms a virtual array. The virtual arrays are positioned at the same side of the area of interest, where targets are situated. The deviation is determined by subtracting the "coarse position of each receiver in the set of receivers" from the position of each receiver in the set of receivers forming the virtual array. The position deviation is caused by calibration error of stationary positions, or inaccurate GPS. If the deviation, which can be as large as several radar central frequency wavelengths, is not well compensated, the generated radar image will be out of focus. If the deviation is well compensated, the subtraction of the receiver course position from the receiver virtual array position should be zero and the corresponding fused radar image is well focused. With proper distance compensation, the radar reflections are aligned in time such that they can add up spatially at the target position to form a focused image of the target in radar imaging process.

Step 170 of FIG. 1A includes determining a set of shifts of the radar image, such that each shift from the set of shifts corresponds to an antenna from the set of antennas, and is caused by an uncertainty in a position of the antenna.

Step 175 of FIG. 1A includes update the estimate of the radar image, based on the determined set of shifts of the radar image, such that for each antenna, the estimate of the radar image is shifted by the determined shift of the radar image corresponding to the antenna from the set of antennas, that fits the reflections of the ROI measurements of the antenna.

Step 180 of FIG. 1A includes outputting, via an output interface in communication with the processor, the radar image from the updated estimate of the radar image.

FIG. 1B is a block diagram of some of the radar systems and methods 100B that show a set of antennas 101 that can communicate to each other, and are in communication with a computer/processor 141. The set of antennas 101 can be synchronized and can store collected data in a memory 143 that is processed by an auto-focus imaging processor 145 of the computer 141. The auto-focus imaging processor 145 can perform the system and method to produce an auto-focused high resolution two-dimensional (2D) radar image. The imaging result can be shown in an user interface 147 of the computer 141. Note the computer 141, can be a processor or multiple computers or multiple processors, that are in communication with the other computer(s) or processor(s).

Figure 1C:
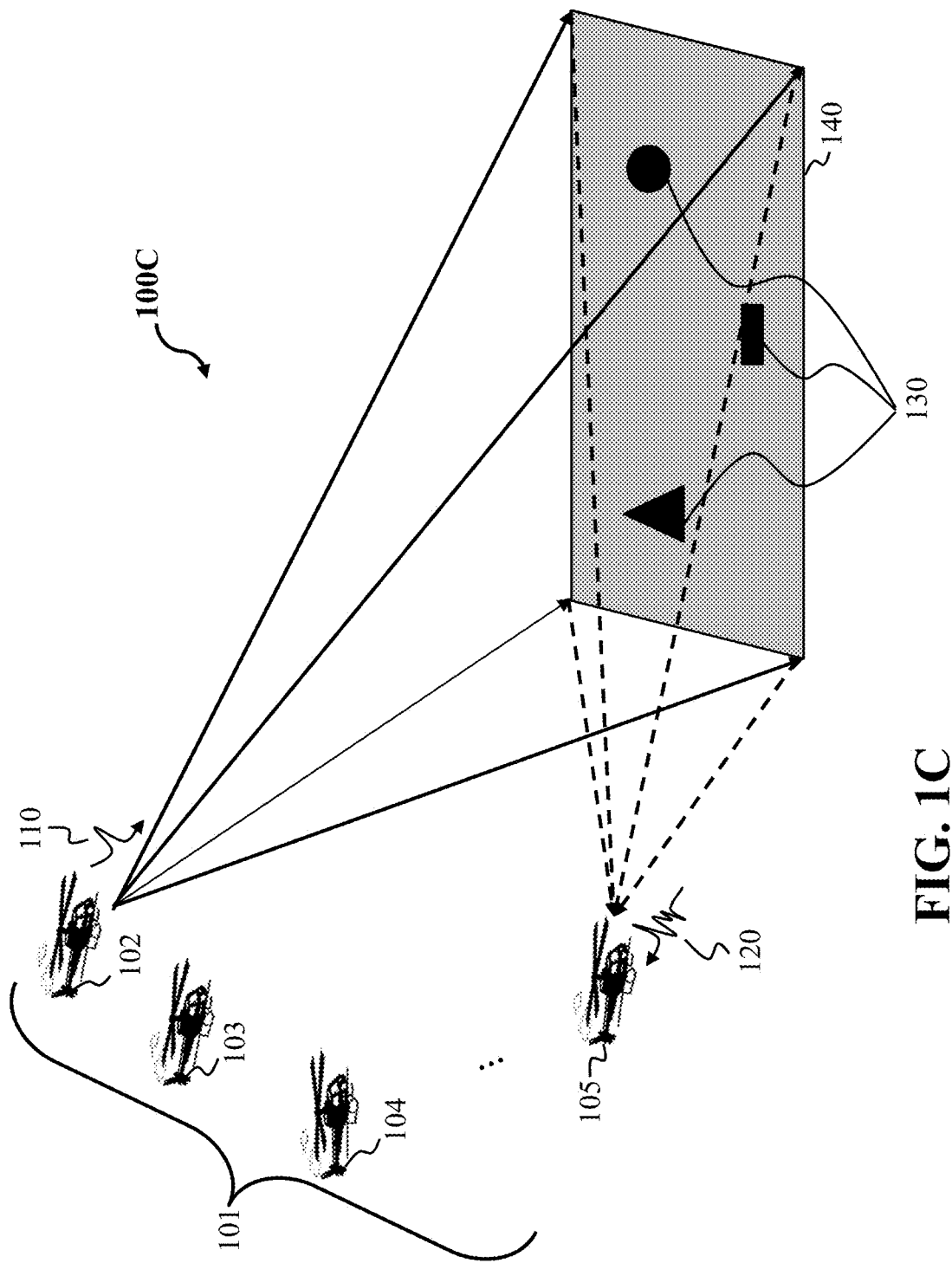
FIG. 1C is a schematic illustrating a radar system having a set of antennas at different positions to measure a set of reflections from a Region of Interest (ROI) corresponding to transmitted radar pulses, according to embodiments of the present disclosure.

FIG. 1C is a schematic illustrating at least one system and method 100C having distributed arrays of moving radar platforms 101 for detecting targets 130 in a region of interest (ROI) 140, according to embodiments of the present disclosure. In particular, the system and method 100C, can be an airborne platform or vehicle mounted platform, etc, that includes at least one moving transmit/receive platform or transmitter/receiver 102, and a set of M distributed moving similar receiver platforms or receivers 103, 104, 105. It is contemplated that the set of M distributed receivers may be five or more, 10 or more or 20 or more. Radar pulses 110 are transmitted from the at least one transmitter/receiver 102, to illuminate targets 130 situated in an area of interest or region of interest (ROI) 140, and the corresponding reflected radar reflections 120 are recorded by the multiple distributed receivers 102, 103, 104 and 105. The reflections 120 can be characterized as a weighted combination of delayed pulses, where complex weights depend on specific target reflectivities and antenna patterns. Given the pulses and reflections, radar images can be generated in a range-azimuth plane according to corresponding weights and delays. The azimuth resolution of the radar images depends on a size of an array aperture, and a range resolution depends on a bandwidth of the pulses.

A fundamental challenge that arises in distributed array imaging comes from uncertainty in the exact positions of the antennas. While advanced positioning and navigation systems, such as the global navigation satellite system (GPS/GNSS) and the inertial navigation system (INS) provide somewhat accurate location information, the remaining uncertainty in the true antenna positions can span multiple wavelengths. As a result, the received signal contains a gain and phase ambiguity when the inexact antenna positions are used as reference. Consequently, applying standard reconstruction techniques without accounting for the position perturbation produces out-of-focus radar images.

Discovered during experimentation were a multitude of solutions that addressed the radar autofocus problem, particularly in the collocated antenna setting, that included developing tools compensating for the antenna position errors. In some cases, the underlying structure of the radar image, such as its sparsity, was utilized to limit the solution space and produce higher quality reconstructions. Fundamental to the autofocus problem learned through experimentation was the task of resolving the gain and phase errors in the measured signal, which manifests as a blind deconvolution problem in the measurement domain. Contrary to existing conventional techniques that model the gain and phase ambiguity as a convolution in the measurement domain, the present disclosure used a model for every measured signal as an observation through the erroneous radar operator of a convolution between the static scene and a two-dimensional shift kernel.

FIG. 1D and FIG. 1E are schematics, when viewed together, illustrate distortion that affects the measured time domain signal of each antenna due to the error in the antenna position, when measuring the reflection of a single target, according to embodiments of the present disclosure. Further, FIGS. 1D and 1E are schematics of step 160 of FIG. 1A illustrating the effect of the position perturbation on the aligning in time of the set of radar reflections.

FIG. 1F is a schematic illustrating the mapping between a set of antennas having perturbed positions and measuring the reflection of a single target to a set of antennas having uniform linear positions and measuring shifted versions of the same target from FIG. 1D and FIG. 1E, according to embodiments of the present disclosure. Further, FIG. 1F is a schematic of the signal model that is used in step 170 of FIG. 1A that the measured reflections of a single target at the perturbed antenna positions is equivalent to measuring shifted versions of the same target at the erroneous coarse positions of the set of receivers 102x, 103x, 104x, 105x, so as to later determine a set of image shifts for the set of receivers.

Figure 1G:
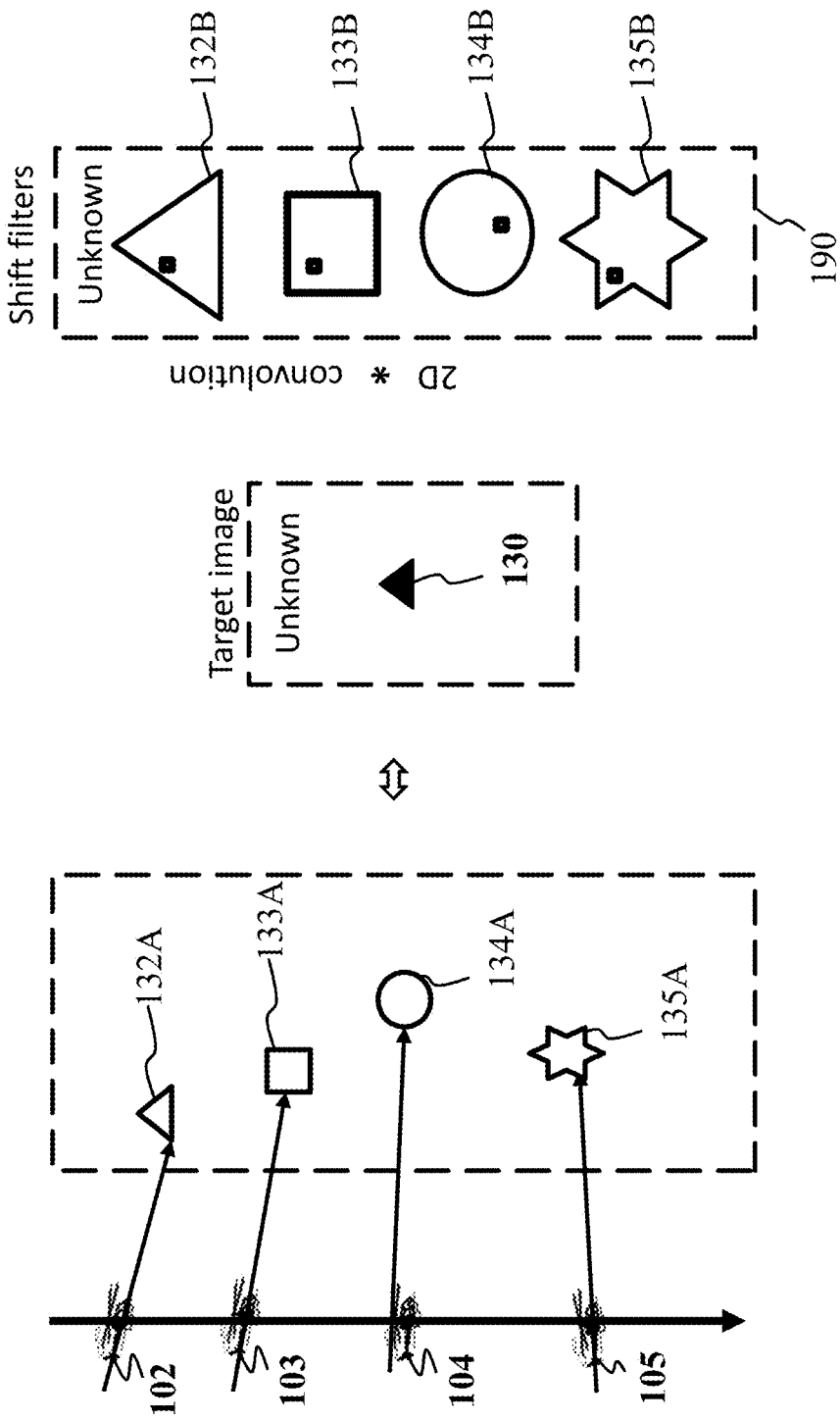
FIG. 1G is a schematic illustrating the relationship between the shifted target images and true target image convolved with a set of shift kernels, according to embodiments of the present disclosure.

FIG. 1G is a schematic illustrating the relationship between the shifted target images 132A, 133A, 134A, 135A and true target image 130 convolved with a set of shift kernels 132B, 133B, 134B, 135B, according to embodiments of the present disclosure. The measured reflections 102x, 103x, 104x, 105x in FIG. 1E correspond to measurements of a true target 130 by antennas located at coarse perturbed positions 102, 103, 104, 105 in FIG. 1D. These same measured reflections also correspond to radar reflections of shifted targets 132A, 133A, 134A, 135A by antennas located at erroneous coarse antenna positions 102x, 103x, 104x, 105x in FIG. 1F, which in turn are shown to be equivalent to reflections of a true target 130 that is convolved with image shifts 132B, 133B, 134B, 135B in FIG. 1G.

Figure 2:
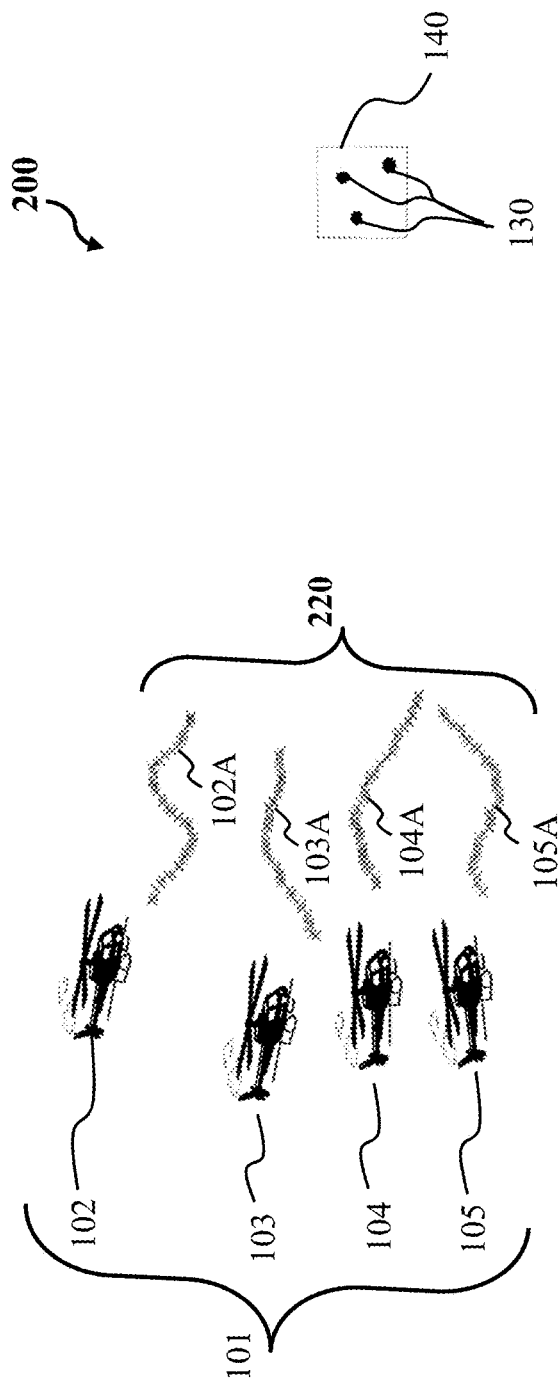
FIG. 2 is a schematic illustrating a distributed moving radar imaging system showing the emitted radar pulses emitted toward the ROI, according to embodiments of the present disclosure.

FIG. 2 is a schematic illustrating a distributed moving radar imaging system showing the emitted radar pulses emitted toward the ROI, according to embodiments of the present disclosure. For example, FIG. 2 illustrates a distributed moving radar imaging system 200, which is similar to that of FIG. 1A. The radar receivers are receiving radar pulse reflections 102A, 103A, 104A, 105A, that form the virtual array 220. The radar pulse reflections are from emitted radar pulses from a transmitter toward the ROI and reflected from the ROI toward the receivers to form the virtual array 220 of receivers. The distributed arrays of moving radar platforms 101 includes at least one radar platform having an antenna cell which is connected to a radar transmitter 102 that generates the radar pulses toward the ROI. As noted above, the radar transmitter 102 is combined with a receiver 102. The radar receivers 102, 103, 104, 105 acquire reflections reflected by targets 130 in the area of interest (ROI) 140.

Still referring to FIG. 2, the radar receivers 102, 103, 104, 105 are moving along a pre-designed trajectory, and the effective position of each radar receiver where the pulse reflections are received 102A, 103A, 104A, 105A, forms the virtual array 220 of a set of $N_m$ (m=1, ..., M) elements. The virtual arrays 220 are positioned at the same side of the area of interest 140, where targets 130 are situated. The radar receivers 102, 103, 104, 105 are perturbed with random position errors greater than the radar source pulse center wavelength, but within a predetermined range. The multiple radar receivers 102, 103, 104, 105 form multiple distributed non-uniform arrays.

Regarding FIG. 1D, FIG. 1E and FIG. 1F, at least one problem to solve during experimentation is recovering of an image 130 of FIG. 1C of a stationary scene 140 composed of sparse targets, and represented in vector form as $x \in C^N$. For example, the image is to be recovered by processing F-dimensional frequency-domain measurements $\{\tilde{y}_m\}_{m=1}^M$ 120 from M distributed antennas 101 that suffer from position ambiguity. The present disclosure has developed an image reconstruction framework FIGS. 1D, 1E, 1F, wherein a perturbation in the antenna positions results in a measured signal that corresponds to an image-domain convolution model as illustrated in FIGS. 1E, 1F, 1G. More precisely, by denoting the radar propagation matrix at the correct antenna positions 102, 103, 104, 105 by $\tilde{A}_m$, and denote by $A_m$ the corresponding matrix at the incorrect positions 102x, 103x, 104x, 105x of FIG. 1F, then we have $\tilde{y}_m = \tilde{A}_m x \neq A_m x$. Unfortunately, the only provided measurements are $\tilde{y}_m$ 120 and the matrices $A_m$. The position ambiguity of radar antennas can be modeled as a time-domain convolution with the measurements, or equivalently, as a gain and phase ambiguity in the frequency-domain of the radar signal, that is, $$\tilde{y}_m = D_{\hat{g}_m} A_m x + n_m, \qquad (1)$$

where $D_{\hat{g}_m}$ is a diagonal matrix with the phase correction vector $\hat{g}_m \in C^F$ on its diagonal entries, and $n_m$ is a measurement noise vector. The system in (1) is ill-posed in general since for any M measurements, which leaves us with MF equations and MF+N unknowns. Alternatively, an aspect of the present disclosure is to represent the gain and phase ambiguity as an image-domain convolution FIG. 1E, 1F where a two-dimensional spatial shift kernel $h_m$ 190 is applied to the radar image x, i.e., $$\tilde{y}_m = A_m (x * h_m) + n_m. \qquad (2)$$

Under this particular model, the shift kernels are one-sparse vectors with unknown support locations, thereby reducing the unknown degrees of freedom to M log (F)+N.

In formulating the problem, aspects include addressing a signal model, convolution in the measurement-domain and the convolution in the image-domain, among other things, as illustrated in FIGS. 3-6 below.

Signal Model

The present disclosure includes considering a two-dimensional radar imaging scenario in which M distributed antennas are used to detect K targets. The targets are located within a spatial region of interest that is discretized on a grid $\Omega \subset R^2, |\Omega|=N$, and $N=N_x \times N_y$ with $N_x$ and $N_y$ specifying the number of grid points in the horizontal and vertical directions. Denote by $1e$ SI the spatial position of a grid-point in $\Omega$.

Let $\Gamma \subset R^2$, $|\Gamma|=M$ be the set of all the spatial locations of the M antennas. Without loss of generality, assume that a subset of the antennas act as transmitter/receivers while the remaining antennas are only receivers. A transmitting antenna at position $r \in \Gamma$ emits a time-domain pulse p(t) 110 in FIG. 3A with frequency spectrum $P(\omega)$, where $\omega = 2\pi f$ is the angular frequency and $f \in B$ is the ordinary frequency in the signal bandwidth B, $|B|=F$.

Denote by $y_m:=y(r_m, r'_m)$ and by $A_m:=A(r_m, r'_m)$ the corresponding measurement vector and imaging operator of antenna pair $(r_m, r'_m)$ indexed by m. Let $\tilde{r}_m = r_m + e_m$ and $\tilde{r}'_m = r'_m + e'_m$ be the perturbed transmitter and receiver positions, respectively, where $e_m$ denote $e'_m$ the positioning errors. The received antenna measurement $\tilde{y}_m := y(\tilde{r}_m, \tilde{r}'_m)$ 120 observes the scene reflectivity x 140 through the perturbed imaging operator $$\tilde{A}_m := A(\tilde{r}_m, \tilde{r}'_m) \text{ i.e.,}$$

$$\tilde{y}_m = \tilde{A}_m x + n_m. \qquad (3)$$

Since the operator $\tilde{A}_m$ is unknown, the received measurements $\tilde{y}_m$ are defined as a function of $A_m$ and x.

Convolution in the Measurement-Domain

The present disclosure uses approaches for radar autofocus that utilize a gain and phase correction in the frequency measurement to describe $\tilde{y}_m$ in terms of $A_m$ and x. More precisely, let $\hat{g}_m \in C^F$ be a complex valued vector corresponding to the Fourier transform of a time-domain kernel $g_m \in R^M$. The received measurement is expressed as in (1). Therefore, given M measurements $\tilde{y}_m$, $m \in \{1 \ldots M\}$, the radar autofocus problem is regarded as a bilinear inverse problem in both the reflectivity image x and the phase correction vectors $\hat{g}_m$ for all m.

What can be noticed is that the system in (1) has F equations with F+N unknowns, which makes it severely ill-posed. Even in the case where x is sparse, the problem remains ill-posed since a general phase correction vector $\hat{g}_m$ continues to have F degrees of freedom. In order to make the problem tractable, the kernels $g_m = F_1^H \hat{g}_m$ can be assumed to be shift kernels, which reduces its degrees of freedom to a singe phase angle. However, the approximation that $g_m$ is a shift operator is only valid in the far field regime and where the position error can be approximated by a one dimensional shift in the down-range direction of the virtual antenna array.

Convolution in the Image-Domain

The present disclosure also considers an alternate model to the convolution with a shift kernel in the measurement-domain by switching the convolution to the image-domain. Let $h_m \in R^{N_h^2}$, $N_h \leq \min\{N_x, N_y\}$ be a vectorized two-dimensional shift kernel of size $N_h \times N_h$. Under the new model, the received signal of the antenna pair indexed by m is written as in (2).

SOME EMBODIMENTS

For example, the present disclosure considers the image-domain convolution model that can be expressed in the spatial Fourier domain, see below:

$$\tilde{y}_m = A_m(x * h_m) + n_m \quad (4)$$
$$= A_m F_2^H D_{\hat{h}_m} \hat{x} + n_m,$$

where $F_2$ is the two dimensional Fourier transform operator applied to the vectorization of a matrix, $\hat{h}_m = F_2 h_m$ and $\hat{x} = F_2 x$ denote the two-dimensional Fourier transforms of $h_m$ and $x$, respectively, and $D_{\hat{h}_m}$ is the diagonal matrix with $\hat{h}_m$ on the diagonal. The present disclosure presents a block coordinate descent approach for computing the radar reflectivity image x and the spatial convolution filters $h_m$, from noisy measurements $\tilde{y}_m$.

Initially, first is to incorporate into the model in (4) the prior information that the image x 140 of FIG. 1C is sparse and piecewise continuous and that the kernels $h_m$ are two dimensional shift operators. Therefore, a fused Lasso[23] regularizer $R_x(\cdot)$ is added for x and an $l_1$ norm regularizer $R_h(\cdot)$ to $h_m$. The overall optimization problem can be described as follows $$\min_{x \in \mathbb{C}^N}, \sum_{m=1}^{M} \frac{1}{2} \left\| \tilde{y}_m - A_m F_2^H D_{\hat{h}_m} \hat{x} \right\|_2^2 \quad (5)$$
$$h_m \in \mathbb{R}_+^{N_h^2} + \mu R_h(h_m) + \lambda R_x(x)$$
$$\text{subject to } 1^T h_m = 1, \forall m \in \{1 \ldots M\},$$

where 1 is the all one vector, and as before, $\hat{h}_m = F_2 h_m$ and $\hat{x} = F_2 x$. The parameters $\mu$ and $\lambda$ are regularization parameters controlling the tradeoff between the signal priors and the data mismatch cost.

The fused Lasso regularizer $R_x(x)$ combines the $l_1$ norm and the total variation (TV) norm of a signal:

$$R_x(x) = \|x\|_1 + \gamma \|x\|_{TV}, \quad (6)$$

where the total variation norm is defined by $$\|x\|_{TV} := \|s\|_{2,1} = \sum_{j=1}^{N} \sqrt{s^2(j) + s^2(N+j)}. \quad (7)$$

the sum of the $l_2$ norms of groups of elements in the gradient vector S=Ex, where $E: \mathbb{C}^N \to \mathbb{C}^{2N}$ is the two dimensional finite difference operator, such that, the first N entries of s contain the horizontal gradient coefficients, and the second N entries contain the vertical gradient coefficients. On the other hand, the property of a shift kernel requires that every $h_m$ is one sparse with a nonzero entry equal to one. Since $h_m$ is nonnegative with the sum of its entries equal to one, the only regularization required is the $l_1$ norm penalty:

$$R_h(h_m) = \sum_{m=1}^{M} \|h_m\|_1. \quad (8)$$

---

Regarding, Algorithm 1 - Block coordinate descent for solving (5):

input: measurements $\{\tilde{y}_m\}_{m=1}^{M}$, initial guess $x^0$, $h^0$, maximum subroutine iterations T, and regularization parameters $\lambda$, $\mu$.
set: $j \leftarrow 1$; $\tilde{h}_m^0$, $h_m^0$, $\leftarrow h^0$ for all m
1: repeat
2:     $\mathcal{A}_x^m \leftarrow \mathcal{A}_x^m (h_m^{j-1})$ for all m
3:     $x^j \leftarrow \text{fista}(\{\mathcal{A}_x^m\}_{m=1}^{M}, \lambda R_x, \{\tilde{y}_m\}_{m=1}^{M}, x^{j-1}, T)$
4:     for m $\leftarrow$ 1 to M do
5:         $\mathcal{A}_h^m \leftarrow \mathcal{A}_h^m (x^j)$
6:         $\tilde{h}_m^j \leftarrow \text{fista}(\mathcal{A}_h^m, \mu R_h, \tilde{y}_m, \tilde{h}_m^{j-1}, T)$
7:         $h_m^j \leftarrow P(\tilde{h}_m^j)$
8:     $j \leftarrow j + 1$
9: until stopping criterion
return: estimate of the radar image $x^j$.

---

Figure 3A:
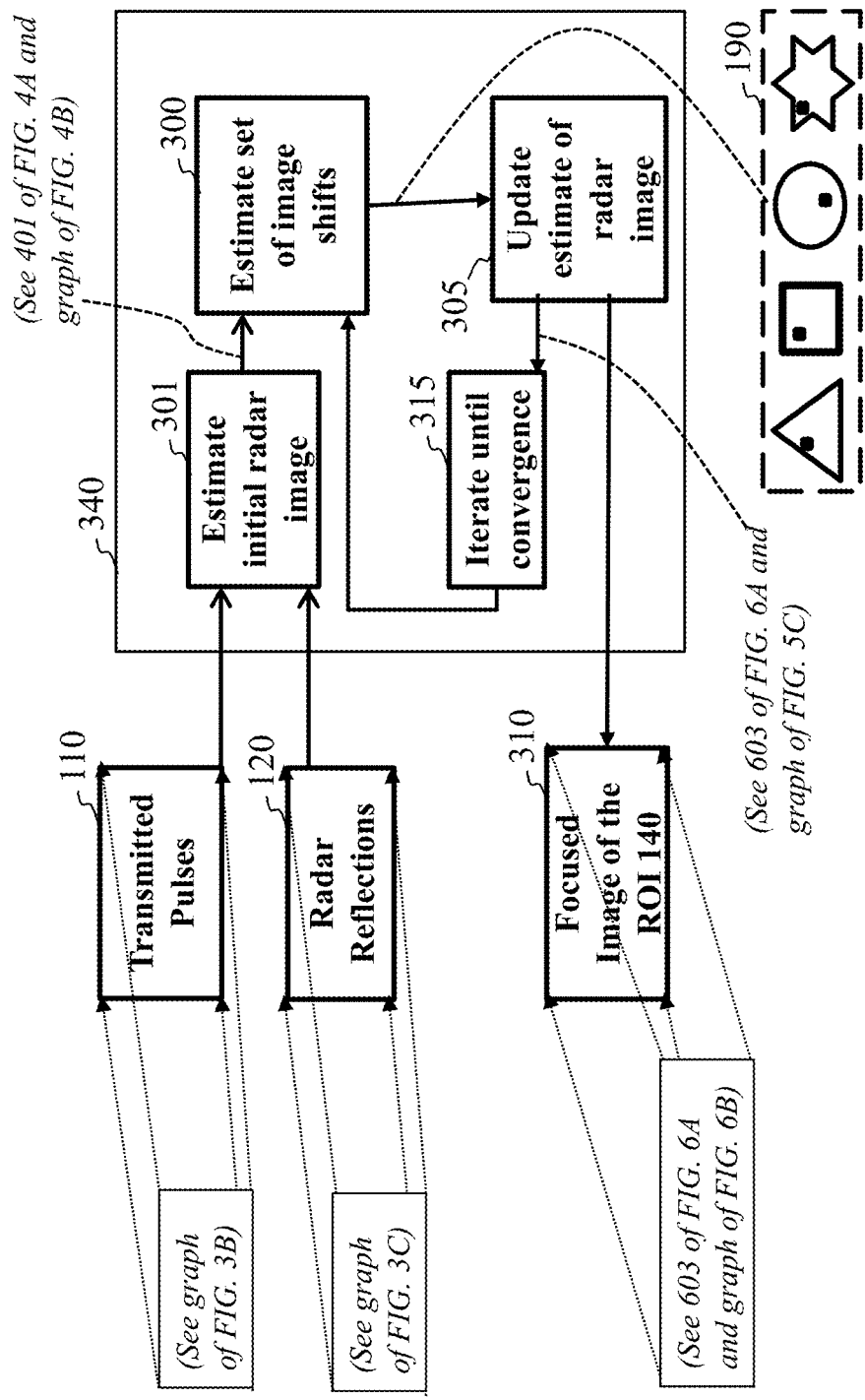
FIG. 3A is a block diagram of a blind deconvolution method for estimating the radar image and the set of image shifts, according to the embodiments of the present disclosure.

What can be clearly apparent is that problem (5) is nonconvex and at least one goal of the present disclosue regarding this context is to find a stationary point to the problem. Therefore, in Algorithm 1, presented is a block coordinate descent approach that alternates between descent steps for each of x and $h_m$, for all m. FIG. 3A illustrates a block diagram of the steps involved in the Algorithm 1. The shift kernels $h_m$ 190 of FIG. 1G are all initialized to the no-shift kernel $h^0$, an $N_h \times N_h$ zero-valued matrix with the central entry set equal to one.

FIG. 3A is a block diagram of a blind deconvolution method for estimating the radar image and the set of image shifts according to the embodiments of the present disclosure. In particular, step 340 illustrates the iterative procedure for obtaining estimates for the radar image and estimate for the set of image shifts and relates to steps 165, 170, and 175 of FIG. 1A. Such that, FIG. 3A illustrates a block diagram of the steps involved in Algorithm 1, as discussed below, which is associated with the shift kernels $h_m$ of step 190 of FIG. 1G.

Figure 3B:
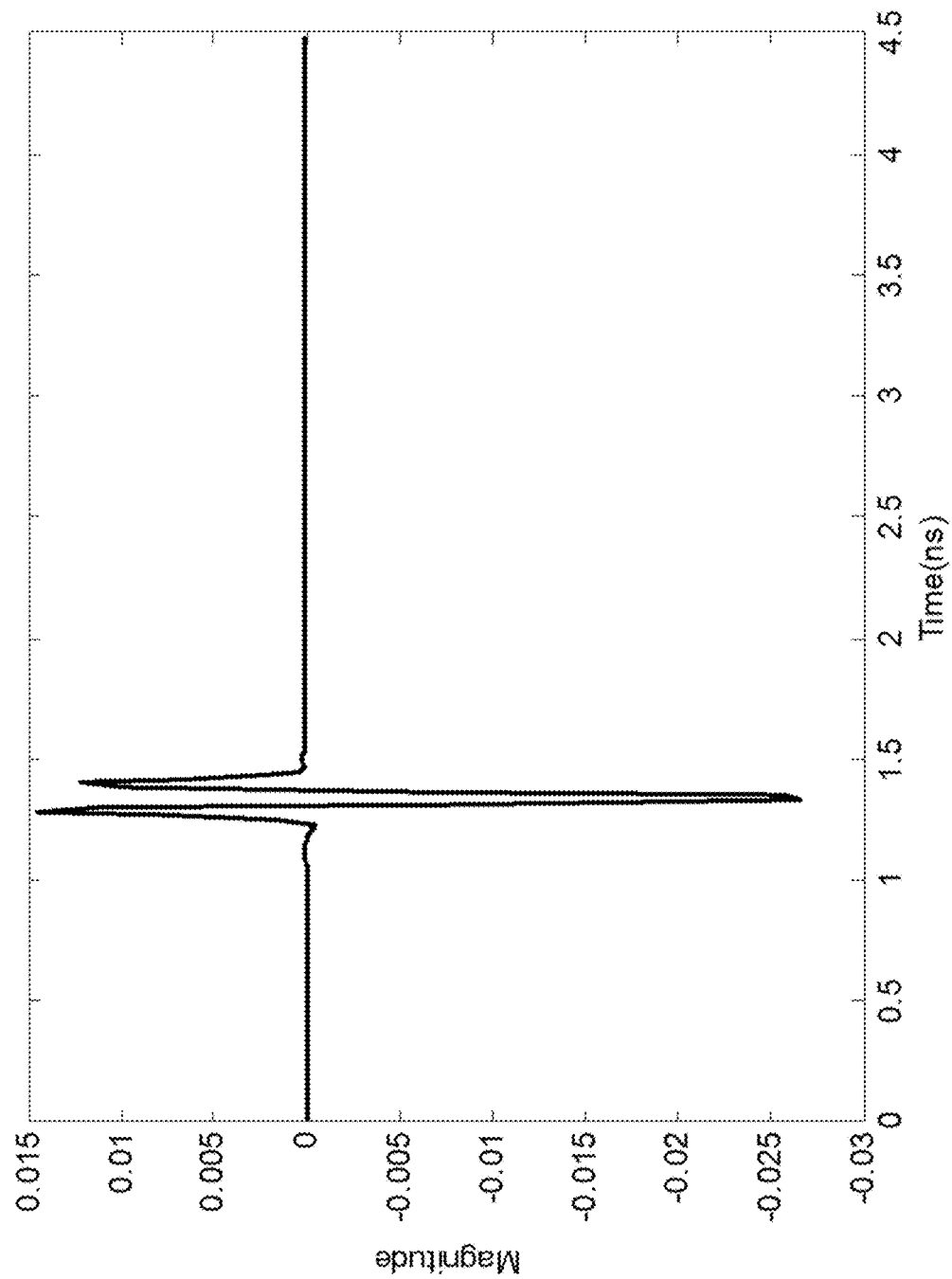
FIG. 3B a graph illustrating transmitted pulses in FIG. 3A, according to the embodiments of the present disclosure.

Step 110 of FIG. 3A illustrates the transmitted pulses, wherein a graph representing the transmitted pulses is provided in FIG. 3B.

Figure 3C:
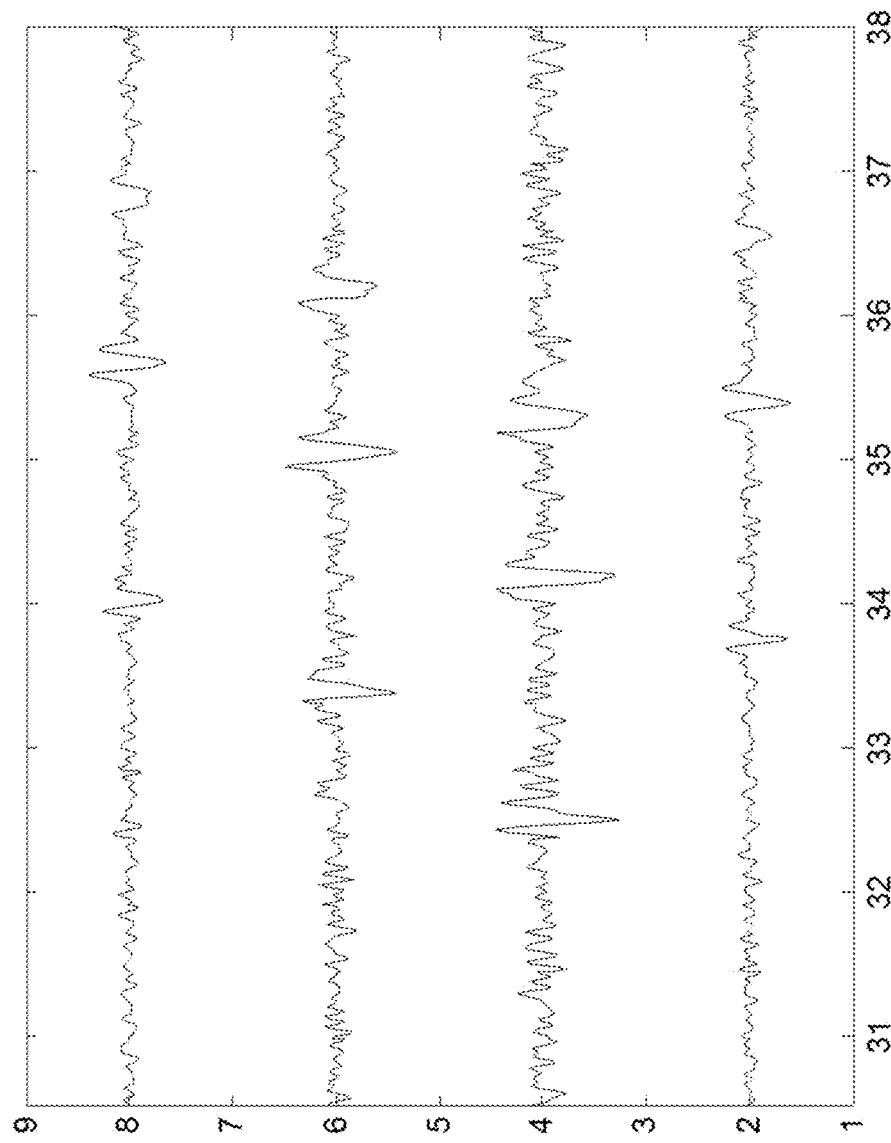
FIG. 3C a graph illustrating radar reflections in FIG. 3A, according to the embodiments of the present disclosure.

Step 120 of FIG. 3A illustrates the radar reflections, wherein a graph representing the radar reflections is provided in FIG. 3C.

Figure 4A:
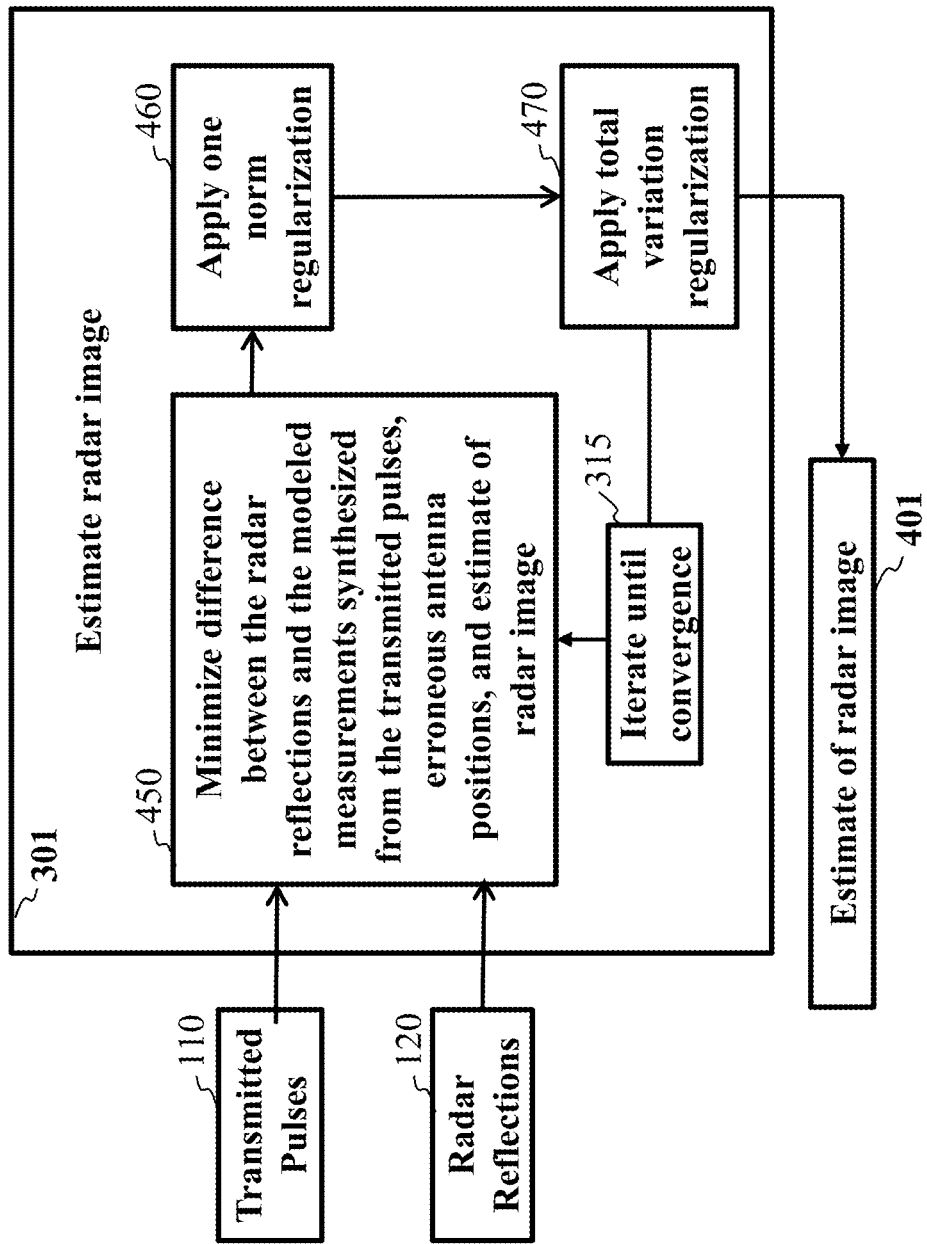
FIG. 4A is a block diagram of the method used for estimating an initial radar image from the measured radar reflections, transmitted pulse, and the wrong antenna positions, according to embodiments of the present disclosure.
Figure 4B:
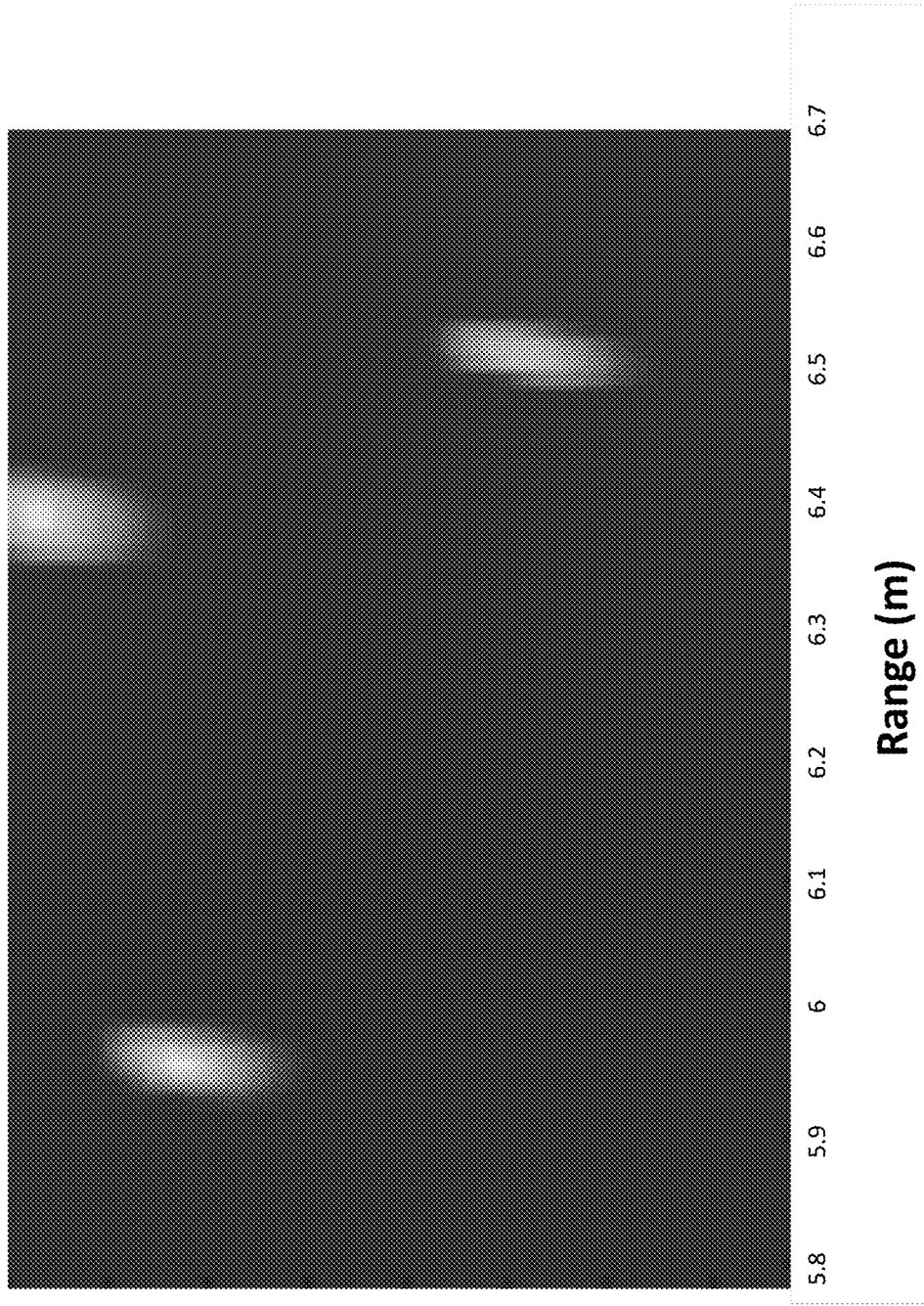
FIG. 4B a graph illustrating an initial radar image in FIG. 4A, according to embodiments of the present disclosure.
Figure 5A:
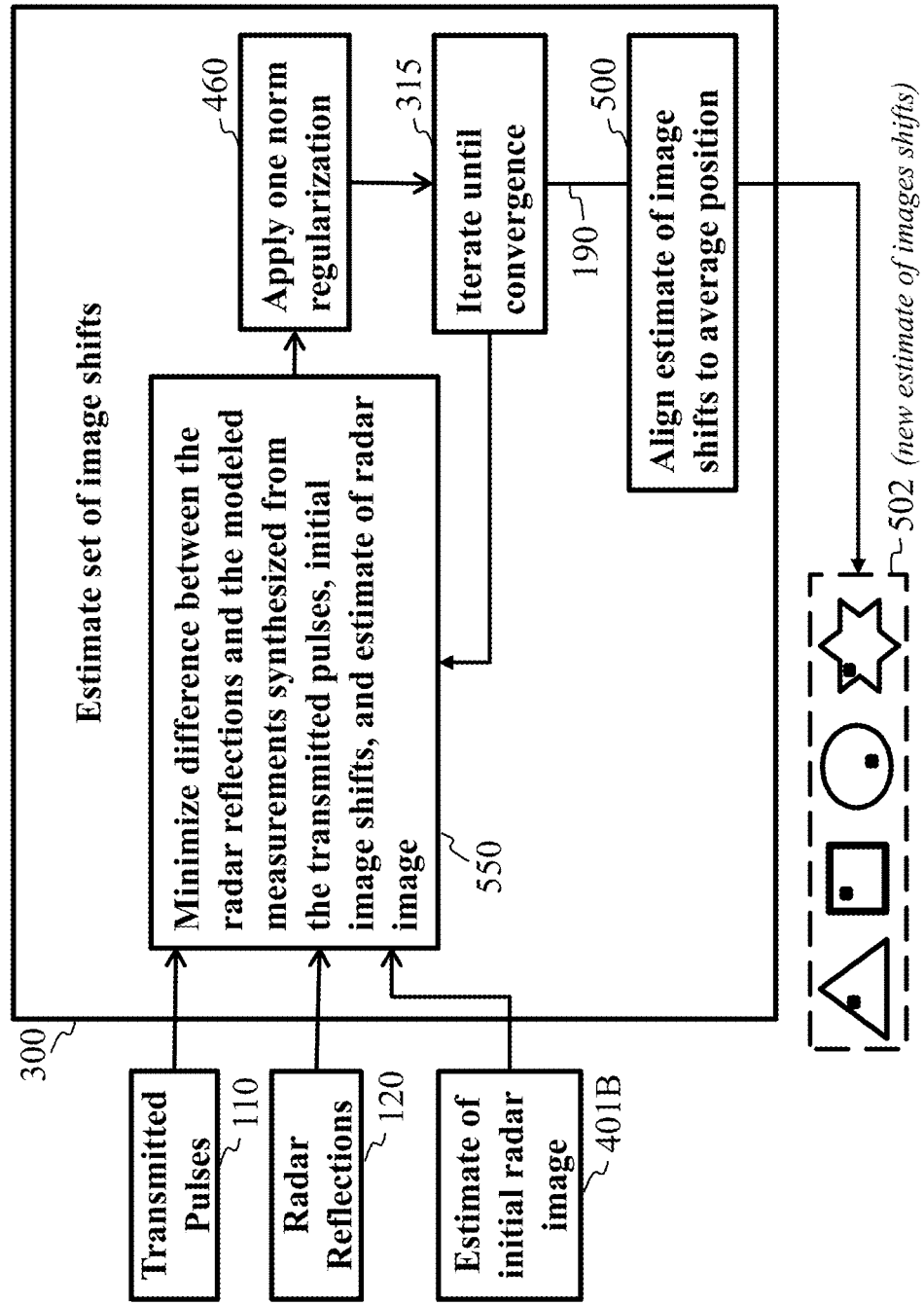
FIG. 5A is a block diagram of the method used to estimate the image shifts using the measured radar reflections and the estimate of the radar image, according to embodiments of the present disclosure.

Step 301 of FIG. 3A represents the process of estimating of the initial image (see 401 of FIG. 4A and graph FIG. 4B) which is obtained by minimizing a difference between the radar reflections 120 and the modeled measurements produced by combining the transmitted pulses 110 and the erroneous antenna positions as illustrated in FIG. 4A Step 300 of FIG. 3A represents the process of estimating a set of image shifts 190 by minimizing a difference between the between the radar reflections and the modeled measurements synthesized from the transmitted pulses, initial image shifts, and estimate of radar image according to the procedure illustrated in FIG. 5A.

Figure 6A:
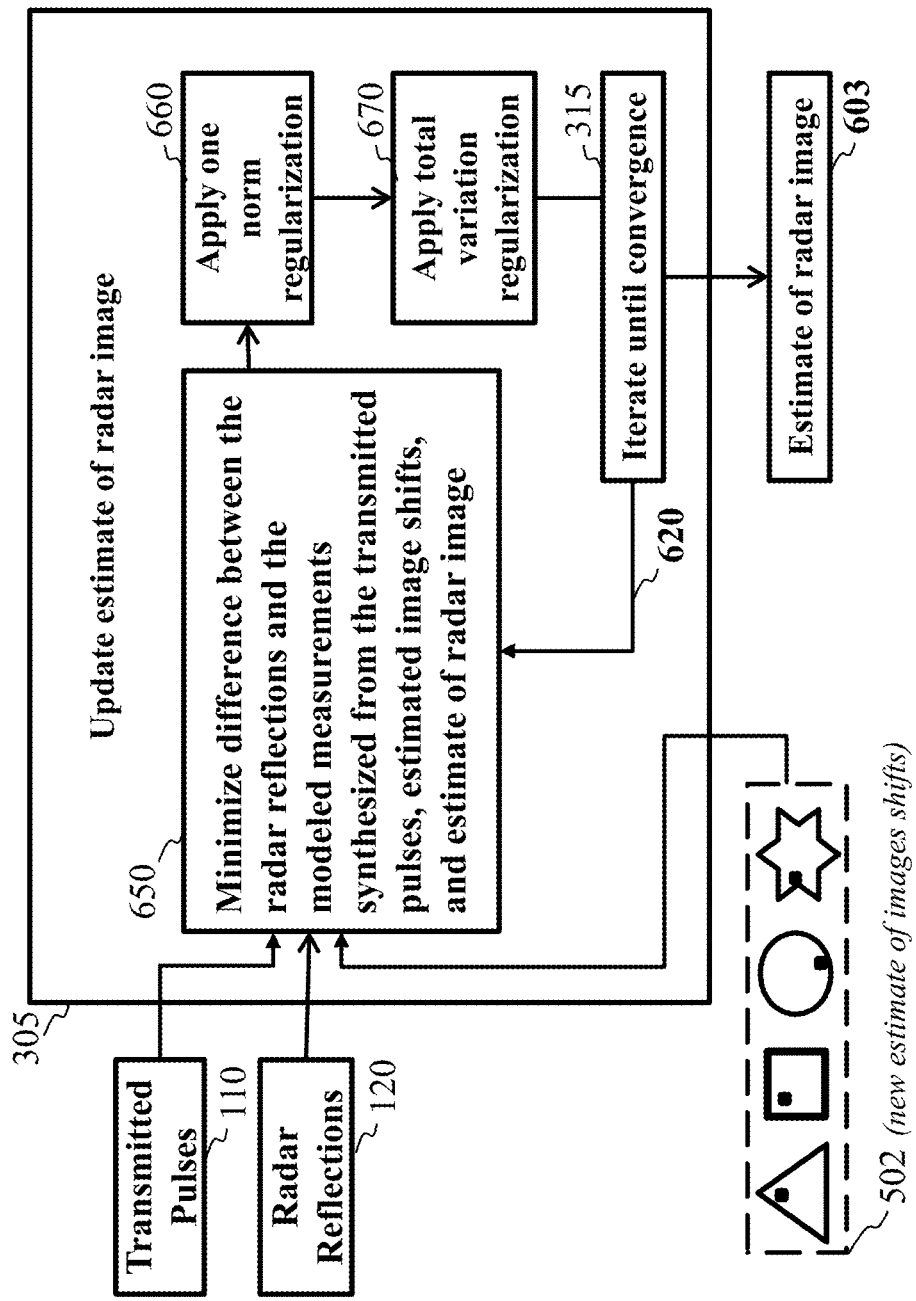
FIG. 6A is a block diagram of the method used to update the radar image using the measured radar reflections and the estimated antenna positions with the application of one-norm regularization and total variation regularization, according to embodiments of the present disclosure.

Step 305 of FIG. 3A represents the process of updating the estimate of the radar image by minimizing the difference between the radar reflections and the modeled measurements synthesized from the transmitted pulses, estimated image shifts, and estimate of radar image, according to the procedure illustrated in FIG. 6A.

Step 315 of FIG. 3A is indicates that the steps of estimating a set of image shifts followed by updating the estimate of the radar image are repeated iteratively until the convergence criterion where the estimate of the radar image does not change is reached.

Step 310 of FIG. 3A represents the process of outputting the converged radar image of the ROI.

FIG. 4A is a block diagram of the method used for estimating an initial radar image from the measured radar reflections, transmitted pulse, and the wrong antenna positions, according to embodiments of the present disclosure. FIG. 4A relates to step 301 of FIG. 3A, regarding estimating the initial radar image, and step 165 of FIG. 1A.

FIG. 4B is a graph illustrating an initial radar image relating to step 401 in FIG. 4A, according to embodiments of the present disclosure.

For example, the initial radar image in FIG. 4A, is then computed using the initial antenna positions and by computing an update of the image that minimizes the difference 450 between the measured data and the modeled data synthesized using the current estimates. The image is then filtered by applying the one-norm regularizer 460 and the total variation regularizer 470 and the process is repeated until convergence.

FIG. 5A is a block diagram of the method used to estimate the image shifts using the measured radar reflections and the estimate of the radar image, according to embodiments of the present disclosure. In particular, FIG. 5A relates to step 300 of FIG. 3A, and step 175 of FIG. 1A.

Figure 5B:
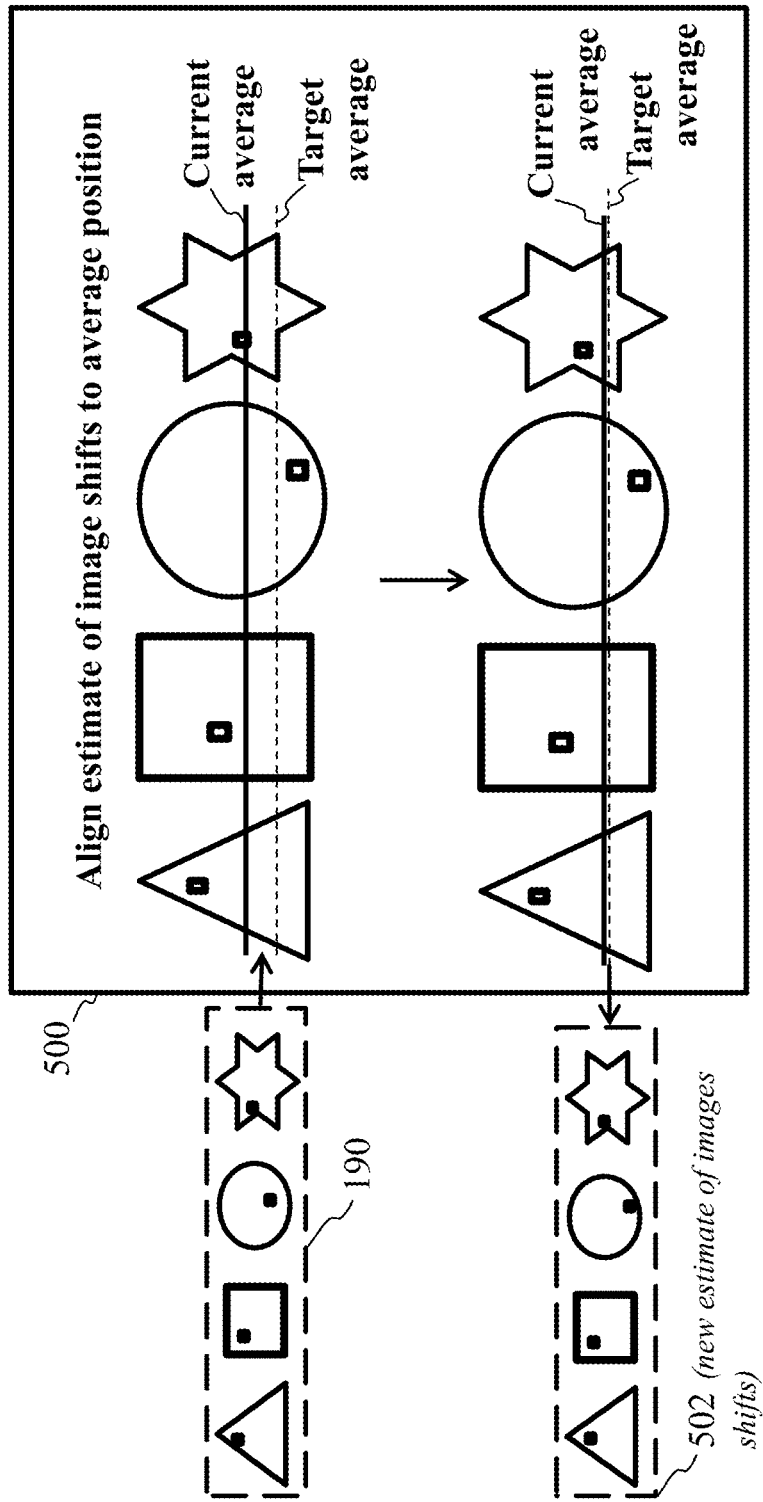
FIG. 5B is a schematic illustrating the step of aligning the estimating image shifts according to the average assumed position of the antennas, according to embodiments of the present disclosure.

FIG. 5B is a schematic illustrating the step of aligning the estimating image shifts according to the average assumed position of the antennas, according to embodiments of the present disclosure.

Referring to FIG. 5A, after the initial image 401B of FIG. 3A is computed, the shift kernels 190 of FIG. 1G are updated by minimizing the difference between the radar reflections and the synthesized or modeled measurements 550 using the methods shown in FIG. 5A. The computed image shifts 190 are then realigned according to the average assumed antenna position using the method illustrated in FIG. 5B to produce the new estimate of images shifts 502.

Figure 5C:
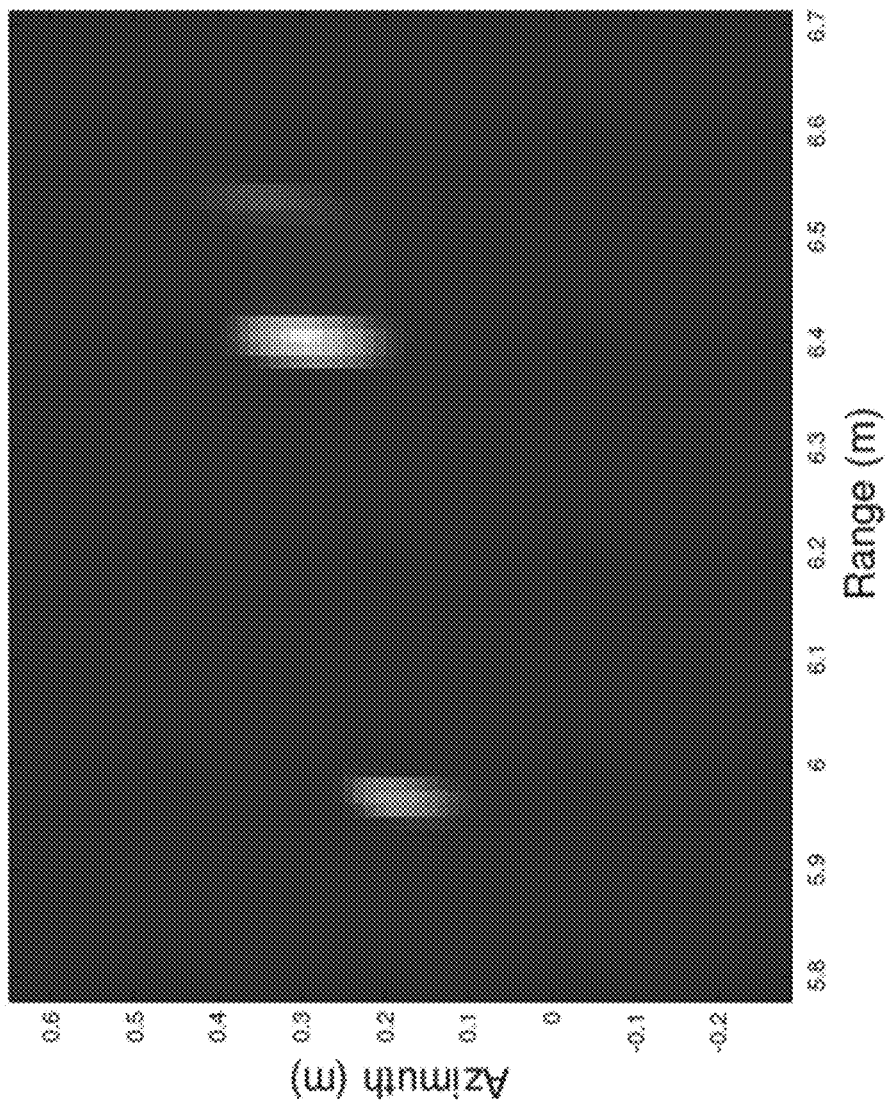
FIG. 5C a graph illustrating an intermediate update of the radar image before the procedure illustrated in FIG. 3A has converged, according to embodiments of the present disclosure.

FIG. 5C a graph illustrating an intermediate radar image relating to step 305 in FIG. 3A, according to embodiments of the present disclosure;

FIG. 6A is a block diagram of the method used to update the radar image using the measured radar reflections and the estimated antenna positions with the application of one-norm regularization and total variation regularization, according to embodiments of the present disclosure. The radar image 603 of FIG. 6A, is then updated using the method in FIG. 6A where a difference between the radar reflections and the modeled measurements is again minimized 650 to produce a new estimate of the radar image. The new estimate is also filtered by applying a one-norm regularization 660 and a total variation norm regularization 670 until convergence where the output image 603 of FIG. 6A is produced. For each descent step, we apply a small number of iterations of the fast iterative shrinkage/thresholding algorithm (FISTA) adapted to the appropriate regularizers of x 603 of FIG. 6A or $\tilde{h}_m$ 190 of FIG. 1G. Moreover, every descent step of $h_m$, produces an estimate $\tilde{h}_m$ which does not necessarily satisfy the shift kernel properties, since we only run a small number of FISTA iterations. Therefore, we use a projector $P(\tilde{h}_m)$ onto the space of shift kernels which sparsifies $\tilde{h}_m$ by setting its largest entry that is closest to the center to one and setting the remaining entries to zero.

Figure 6B:
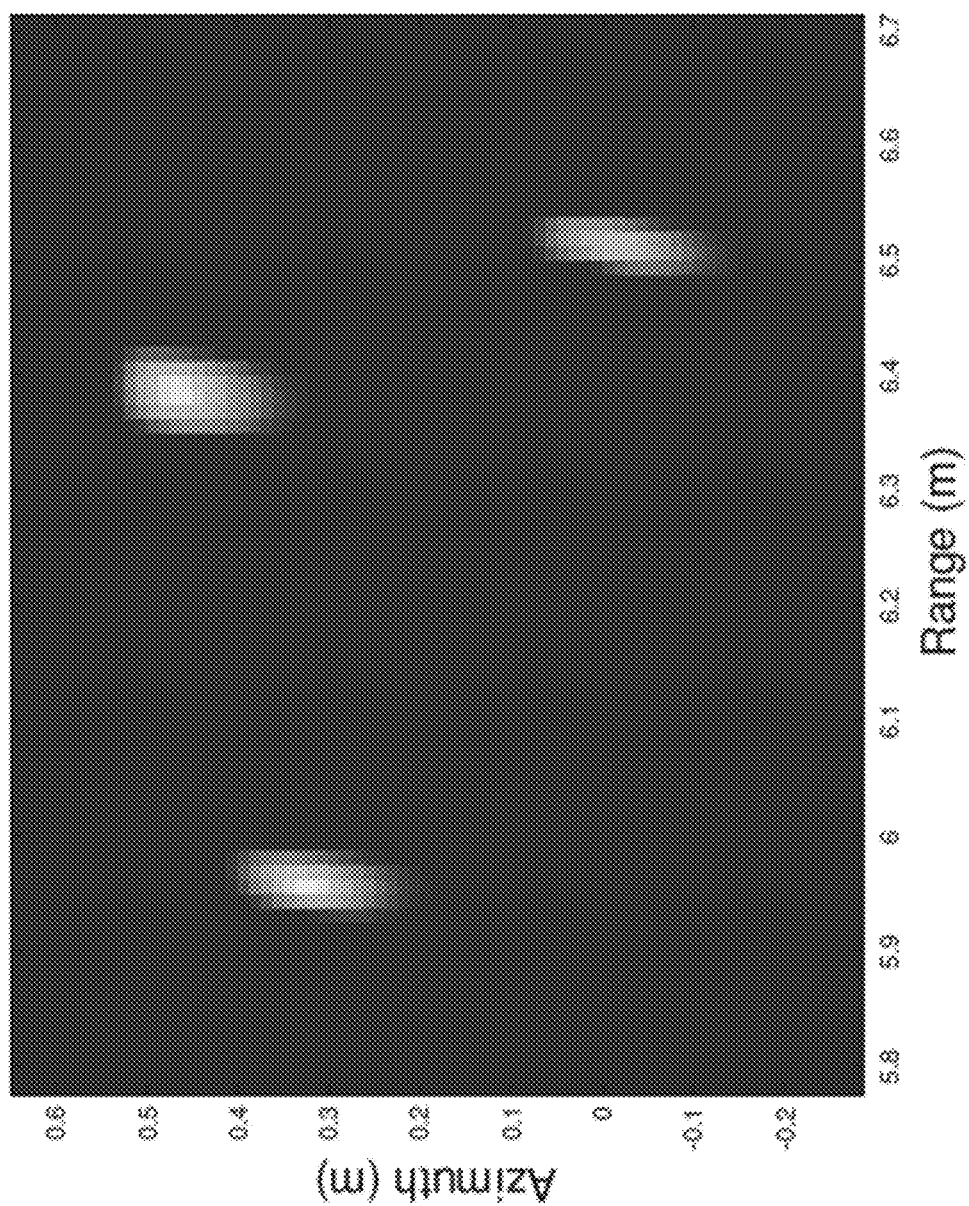
FIG. 6B a graph illustrating step 310 of FIG. 3A and step 603 in FIG. 6A after the procedure in FIG. 3A has converged, according to embodiments of the present disclosure.

FIG. 6B a graph illustrating step 310 of FIG. 3A and step 603 in FIG. 6A after the procedure in FIG. 3A has converged, according to embodiments of the present disclosure.

---

Algorithm 2—fista subroutine for updating $h_m$ input: $\mathcal{A}_h^m$, $\mu R_h$, $\tilde{y}_m$, $\tilde{h}_m^{j-1}$, T.
set: $q_0 = 1$, $u^0 = s^0 = \tilde{h}_m^{j-1}$ 1:    $\alpha \leftarrow$ inverse of maximum eigenvalue of $\mathcal{A}_h^{mH}\mathcal{A}_h^m$
2:    for $t \leftarrow 1$ to T do
3:      $z^t \leftarrow s^{t-1} + \alpha \mathcal{A}_h^{mH}(\tilde{y}_m - \mathcal{A}_h^m s^{t-1})$
4:      $u^t \leftarrow \mathcal{T}_+(z^t; \alpha\mu)$ 5:      $u^t \leftarrow \dfrac{1}{1^T u^t} u^t$ 6:      $q_t \leftarrow \dfrac{1 + \sqrt{1 + 4q_{t-1}^2}}{2}$ 7:      $s^t \leftarrow u^t + \dfrac{q_{t-1} - 1}{q_t}(u^t - u^{t-1})$ return: $s^T$.

---

Algorithm 3—fista subroutine for x input: $\{\mathcal{A}_x^m\}_{m=1}^M$, $\lambda R_x$, $\{\tilde{y}_m\}_{m=1}^M$, $x^{j-1}$, T.
set: $q_0 = 1$, $u^0 = s^0 = x^{j-1}$ 1:    $\alpha \leftarrow$ inverse of maximum eigenvalue of $\sum\limits_{m=1}^{M} \mathcal{A}_x^{mH}\mathcal{A}_x^m$ 2:    for $t \leftarrow 1$ to T do 3:      $z^t \leftarrow s^{t-1} + \alpha \sum\limits_{m=1}^{M} \mathcal{A}_x^{mH}(\tilde{y}_m - \mathcal{A}_x^m s^{t-1})$ 4:      $v^t \leftarrow \mathcal{T}(z^t; \alpha\lambda)$ 5:      $u^t \leftarrow \arg\min\limits_{u \in \mathbb{C}^N} \left\{\dfrac{1}{2}\|u - v^t\|_2^2 + \alpha\lambda\gamma\|u\|_{TV}\right\}$ 6:      $q_t \leftarrow \dfrac{1 + \sqrt{1 + 4q_{t-1}^2}}{2}$ 7:      $s^t \leftarrow u^t + \dfrac{q_{t-1} - 1}{q_t}(u^t - u^{t-1})$ return: $s^T$.

---

In general, FISTA can be used to solve convex optimization problems of the form $$\min_{u \in S} D(u) + \lambda R(u), \tag{9}$$

where $D(u)$ is a smooth data fidelity cost function and R is a regularizer which can be a non-smooth function. In the context of Algorithm 1, we define the subroutine fista($A^m$, $R, y_m, u_{init}, T$) as an algorithm that runs T iterations of the FISTA procedure with a data fidelity cost function D(u), regularizer R, and initial guess $u_{init}$. The data fidelity cost function is specified by (5) as $$D(u) := \sum_{m=1}^{M} \frac{1}{2} \|\tilde{y}_m - A^m u\|_2^2, \quad (10)$$

where u refers to either the image x or the sequence of convolution kernels $h_m$. The forward operator with the respect to x given the estimates of the kernels $h^t_m$ at iteration t is defined as $$A_x^m(h^t_m) := A_m F_2^H D_{F_2 h^t_m} F_2. \quad (11)$$

Similarly, the forward operator with respect to $h_m$ given the estimate of the image $x^t$ at iteration t is defined as $$A_h^m(x^t) := A_m F_2^H D_{F_2 x^t} F_2. \quad (12)$$

Note that the expression for D in (10) is separable in $h_m$ for every m. Therefore, the FISTA subroutines for updating $h_m$ and x are described in Algorithm 2 and Algorithm 3, respectively. The function $T(z^t; \alpha\lambda)$ is the standard soft-thresholding operator defined as $$T(z; \tau) = \begin{cases} z(j) - \tau, & \text{if } z(j) > \tau \\ z(j) + \tau, & \text{if } z(j) < -\tau \\ 0, & \text{otherwise.} \end{cases} \quad (13)$$

The function $T_+(z;\tau)$ is the non-negative counterpart that excludes the second condition in (13). We handle the combined $l_1$ norm and total variation regularizers of x by splitting the proximal operators into the two stages shown in steps 4 and 5 of Algorithm 3. In the first stage, the soft-thresholding operator $T(z^t;\alpha\lambda)$ is used to sparsify the signal $z^t$. A second proximal operator is then applied in step 5 of the algorithm to enforce the total variation regularization. We implement this proximal operator using an alternating direction method of multipliers (ADMM) algorithm.

Features

Aspects of the present disclosure can include determining the set of shifts of the radar image and updating the estimate of the radar image, is based on the set of shifts of the radar image that is iterated until a termination condition is met. Another aspect can include the hardware processor that can determine the set of shifts and the estimate of the radar image using an alternating optimization, iteratively. Wherein, for each iteration, the hardware processor updates the estimate of the radar image while fixing set of shifts and updates the determined set of shifts while fixing the estimate of the radar image, until the termination condition is met by the convergence of the estimate of the radar image.

Also, another aspect can include an average of true positions of the set of antennas can be known, such that for each iteration of the alternating optimization further includes: aligning the estimated radar image shifts, such that an average of an estimated radar image shifts is equal to the average of the true positions of the set of antennas; and aligning the estimated radar image in a way that compensates the aligning of the estimated radar image shifts, such that, modeled measurements using the aligned radar image shifts and the aligned estimated radar image remain unchanged.

Another aspects of the present disclosure can include the measurements of each antenna can be modeled as a product of a radar operator defining the position of the antenna including the uncertainty, the radar image, and the shift of the antenna to produce modeled measurements. Wherein, the hardware processor for each iteration of the alternating optimization, is configured to update the estimate of the radar image by minimizing a difference between the measurements and the modeled measurements combined with a fused Lasso regularization including a one norm of the estimate of the radar image and a total variation (TV) norm of the estimate of the radar image. Update the determined set of shifts of the radar image by solving a sparse recovery problem minimizing a difference between the measurements and the modeled measurements with the updated estimates of the radar image combined with a one norm of each shift enforcing a single non-zero entry in the updated shift. Wherein, an aspect can include a regularization parameter for the fused Lasso regularization is used to determine an amount of regularization required to produce a focused radar image, that includes: computing an upper bound on the fused Lasso regularizer using the measurements and the radar operator combined with the determined set of shifts; updating the regularization parameter, such that the fused Lasso regularizer is equal to the computed upper bound; and increasing the upper bound after a predetermined number of iterations of the alternating optimization, by using the measurements, the radar operator combined with the determined set of shifts, and a difference between the measurements and the modeled measurements.

Another aspect of the present disclosure includes each antenna in the set of antennas is at a different position in relation to the ROI or some antennas in the set of antennas are at different positions in relation to the ROI. Further, an aspect can include some antennas of the set of antennas transmit radar pulses to the ROI and measure a set of reflections from the ROI. Also, another aspect can include the matching of the reflections of the ROI measurements of each antenna from the set of antennas is by minimizing an error (a difference) between the measurements and the modeled measurements with the updated estimates of the radar image and the updated set of shifts.

Figure 7:
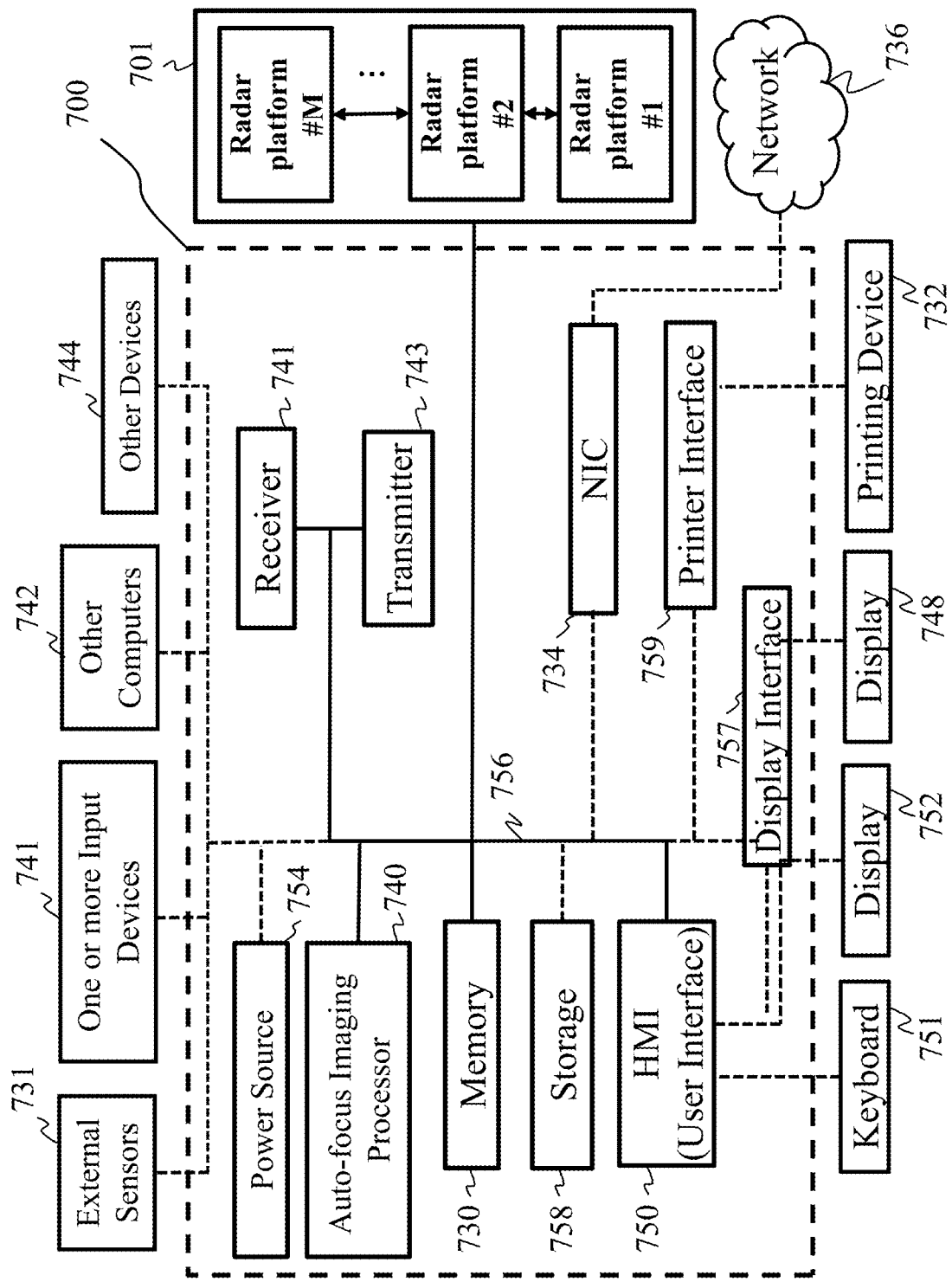
FIG. 7 is a block diagram of the method used to update the radar image using the measured radar reflections and the estimated antenna positions with the application of one-norm regularization and total variation regularization, according to embodiments of the present disclosure.

FIG. 7 is a block diagram of a computer system of the radar system contemplated by the present disclosure, in accordance with some embodiments of the present disclosure. The computer system 700 is in communication with the set of antennas 101, 102, 103, 104, 105 and can store collected data in the memory 730 that is processed by the processor 740 of the computer 700. The computer system 700 can include a human machine interface or user interface 750 that can connect the computer system to a keyboard 751 and display device 752. The computer system 700 can be linked through the bus 756 to a display interface 757 adapted to connect the system 700 to a display device 748, wherein the display device 748 can include a computer monitor, camera, television, projector, or mobile device, among others.

The computer system 700 can include a power source 754, depending upon the application the power source may be optionally located outside of the computer system. The auto-focus imaging processor 740 maybe one or more processors that can be configured to execute stored instructions, as well as be in communication with the memory 730 that stores instructions that are executable by the auto-focus imaging processor 740. The auto-focus imaging processor 740 can be a single core processor, a multi-core processor, a computing cluster, or any number of other configurations. The auto-focus imaging processor 740 is connected through a bus 756 to one or more input and output devices. The memory 730 can include random access memory (RAM), read only memory (ROM), flash memory, or any other suitable memory systems.

Still referring to FIG. 7, the computer system 700 can also include a storage device 758 adapted to store supplementary data and/or software modules used by the auto-focus imaging processor 740. For example, the storage device 758 can store historical data relating to predesigned radar platform trajectories, radar operating frequency bandwidth, transmitted waveform, estimated signal-to-noise ratio, image data relating to target recognition, imaging results using simulated noisy data with different methods dealing with position errors, among other things. The storage device 358 can include a hard drive, an optical drive, a thumb-drive, an array of drives, or any combinations thereof.

Still referring to FIG. 7, a printer interface 759 can also be connected to the computer system 700 through the bus 756 and adapted to connect the computer system 700 to a printing device 732, wherein the printing device 732 can include a liquid inkjet printer, solid ink printer, large-scale commercial printer, thermal printer, UV printer, or dye-sublimation printer, among others. A network interface controller (NIC) 734 is adapted to connect the computer system 700 through the bus 756 to a network 736. The image data or related image data, among other things, can be rendered on a display device, imaging device, and/or printing device via the network 736.

Still referring to FIG. 7, the image data or related image data, among other things, can be transmitted over a communication channel of the network 736, and/or stored within the computer's storage system 758 for storage and/or further processing. Further, the image data or related image data may be received wirelessly or wire from a receiver 741 or transmitted via a transmitter 743 wirelessly or wire, the receiver 741 and transmitter 743 are both connected to the computer system 700 through the bus 756.

The computer system 700 may be connected to external sensors 731, one or more input devices 741, other computers 742 and other devices 744. The external sensors 731 may include motion sensors, inertial sensors, a type of measuring sensor, etc. The external sensors 731 may include sensors for, speed, direction, air flow, distance to an object or location, weather conditions, etc. The input devices 741 can include, for example, a keyboard, a scanner, a microphone, a stylus, a touch sensitive pad or display.

EMBODIMENTS

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The embodiments of our present disclosure include coherent distributed radar imaging by allowing location ambiguities, and on autofocusing for a single sensor array by distributed sensing with multiple sensors. In particular, a multi-static radar imaging approach where one transmitting/receiving radar platform and multiple receiving radar platforms are moving towards a region of interest (ROI) with position perturbations. The embodiments of our present disclosure detect targets inside the ROI. Due to inaccurate positioning and motion errors, the actual array positions are perturbed up to several times a central radar wavelength. Although the image resolution of each sensor array may be low due to its small aperture size, a high-resolution image can be formed by jointly processing the outputs of all distributed arrays with well-compensated position errors. The embodiments of our present disclosure assume a sparse scene, and is realized iteratively by solving series of optimization problems for compensating position-induced phase errors, exploiting target signatures, and estimating antenna positions.

The embodiments of our present disclosure also provide for auto-focus radar imaging for generating a radar image of targets situated in an area of interest using a single moving transmit radar platform or combination transmitter/receiver along with multiple spatially distributed moving radar receiver platforms or receivers. The moving radar receivers are perturbed with unknown position errors up to several radar wavelengths.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed:

1. A radar system to produce a radar image of a region of interest (ROI), the radar system comprising:
a set of antennas at different positions to transmit radar pulses to the ROI and to measure a set of reflections from the ROI corresponding to the transmitted radar pulses, wherein each antenna includes reflections of the ROI measurements specific to the antenna;
a hardware processor configured to
acquire an estimate of the radar image, by matching the reflections of the ROI measurements of each antenna from the set of antennas;
determine a set of shifts of the radar image, such that each shift from the set of shifts corresponds to an antenna from the set of antennas, and is caused by an uncertainty in a position of the antenna;
update the estimate of the radar image, based on the determined set of shifts of the radar image, such that for each antenna, the estimate of the radar image is shifted by the determined shift of the radar image corresponding to the antenna from the set of antennas, that fits the reflections of the ROI measurements of the antenna; and
an output interface rendering the radar image from the updated estimate of the radar image.

2. The radar system of claim 1, wherein determining the set of shifts of the radar image and updating the estimate of the radar image, is based on the set of shifts of the radar image that is iterated until a termination condition is met.

3. The radar system of claim 2, wherein the hardware processor determines the set of shifts and the estimate of the radar image using an alternating optimization, iteratively, wherein, for each iteration, the hardware processor updates the estimate of the radar image while fixing set of shifts and updates the determined set of shifts while fixing the estimate of the radar image, until the termination condition is met by the convergence of the estimate of the radar image.

4. The radar system of claim 3, wherein an average of true positions of the set of antennas is known, such that for each iteration of the alternating optimization further includes:
aligning the estimated radar image shifts, such that an average of an estimated radar image shifts is equal to the average of the true positions of the set of antennas; and
aligning the estimated radar image in a way that compensates the aligning of the estimated radar image shifts, such that, modeled measurements using the aligned radar image shifts and the aligned estimated radar image remain unchanged.

5. The radar system of claim 3, wherein the measurements of each antenna are modeled as a product of a radar operator defining the position of the antenna including the uncertainty, the radar image, and the shift of the antenna to produce modeled measurements, and wherein the hardware processor, for each iteration of the alternating optimization, is configured to
update the estimate of the radar image by minimizing a difference between the measurements and the modeled measurements combined with a fused Lasso regularization including a one norm of the estimate of the radar image and a total variation (TV) norm of the estimate of the radar image; and
update the determined set of shifts of the radar image by solving a sparse recovery problem minimizing a difference between the measurements and the modeled measurements with the updated estimates of the radar image combined with a one norm of each shift enforcing a single non-zero entry in the updated shift.

6. The radar system of claim 5, wherein a regularization parameter for the fused Lasso regularization is used to determine an amount of regularization required to produce a focused radar image, that includes:
computing an upper bound on the fused Lasso regularizer using the measurements and the radar operator combined with the determined set of shifts;
updating the regularization parameter, such that the fused Lasso regularizer is equal to the computed upper bound; and
increasing the upper bound after a predetermined number of iterations of the alternating optimization, by using the measurements, the radar operator combined with the determined set of shifts, and a difference between the measurements and the modeled measurements.

7. The radar system of claim 1, wherein each antenna in the set of antennas is at a different position in relation to the ROI or some antennas in the set of antennas are at different positions in relation to the ROI.

8. The radar system of claim 1, wherein some antennas of the set of antennas transmit radar pulses to the ROI and measure a set of reflections from the ROI.

9. The radar system of claim 1, wherein the matching of the reflections of the ROI measurements of each antenna from the set of antennas is by minimizing an error (a difference) between the measurements and the modeled measurements with the updated estimates of the radar image and the updated set of shifts.

10. A method for a radar system to produce a radar image of a region of interest (ROI), the method comprising:
measuring, using a set of antennas at different positions to transmit radar pulses to the ROI and a set of reflections from the ROI corresponding to the transmitted radar pulses, wherein each antenna includes reflections of the ROI measurements specific to the antenna;

using a hardware processor in communication with the transmitter and set of antennas and a memory, the hardware processor is configured for acquiring an estimate of the radar image, by matching the reflections of the ROI measurements of each antenna from the set of antennas;

determining a set of shifts of the radar image, such that each shift from the set of shifts corresponds to an antenna from the set of antennas, and is caused by an uncertainty in a position of the antenna;

updating the estimate of the radar image, based on the determined set of shifts of the radar image, such that for each antenna, the estimate of the radar image is shifted by a determined shift of the radar image corresponding to the antenna from the set of antennas, that fits the reflections of the ROI measurements of the antenna; and outputting, via an output interface, the radar image from the updated estimate of the radar image.

11. The method of claim 10, wherein determining the set of shifts of the radar image and updating the estimate of the radar image, is based on the set of shifts of the radar image that is iterated until a termination condition is met.

12. The method of claim 11, wherein the determining of the set of shifts and the estimate of the radar image is based on using an alternating optimization, iteratively, wherein, for each iteration, the hardware processor updates the estimate of the radar image while fixing set of shifts and updates the determined set of shifts while fixing the estimate of the radar image, until the termination condition is met by the convergence of the estimate of the radar image.

13. The method of claim 12, wherein an average of true positions of the set of antennas is known, such that for each iteration of the alternating optimization further includes:

aligning the estimated radar image shifts, such that an average of an estimated radar image shifts is equal to the average of the true positions of the set of antennas; and aligning the estimated radar image in a way that compensates the aligning of the estimated radar image shifts, such that, modeled measurements using the aligned radar image shifts and the aligned estimated radar image remain unchanged.

14. The method of claim 13, wherein the measurements of each antenna are modeled as a product of a radar operator defining the position of the antenna including the uncertainty, the radar image, and the shift of the antenna to produce modeled measurements, and wherein the hardware processor, for each iteration of the alternating optimization, is configured to update the estimate of the radar image by minimizing a difference between the measurements and the modeled measurements combined with a fused Lasso regularization including a one norm of the estimate of the radar image and a total variation (TV) norm of the estimate of the radar image; and update the determined set of shifts of the radar image by solving a sparse recovery problem minimizing a difference between the measurements and the modeled measurements with the updated estimates of the radar image combined with a one norm of each shift enforcing a single non-zero entry in the updated shift.

15. The method of claim 14, wherein a regularization parameter for the fused Lasso regularization is used to determine an amount of regularization required to produce a focused radar image, that includes:

computing an upper bound on the fused Lasso regularizer using the measurements and the radar operator combined with the determined set of shifts;

updating the regularization parameter, such that the fused Lasso regularizer is equal to the computed upper bound; and increasing the upper bound after a predetermined number of iterations of the alternating optimization, by using the measurements, the radar operator combined with the determined set of shifts, and a difference between the measurements and the modeled measurements.

16. A radar system to produce a radar image of a region of interest (ROI), the radar system comprising:

a set of antennas at different positions to transmit radar pulses to the ROI and to measure a set of reflections from the ROI corresponding to the transmitted radar pulses, wherein each antenna includes reflections of the ROI measurements specific to the antenna;

a hardware processor configured to acquire an estimate of the radar image, by matching the reflections of the ROI measurements of each antenna from the set of antennas;

determine a set of shifts of the radar image, such that each shift from the set of shifts corresponds to an antenna from the set of antennas, and is caused by an uncertainty in a position of the antenna;

update the estimate of the radar image, based on the determined set of shifts of the radar image, such that for each antenna, the estimate of the radar image is shifted by the determined shift of the radar image corresponding to the antenna from the set of antennas, that fits the reflections of the ROI measurements of the antenna, wherein determining the set of shifts of the radar image and updating the estimate of the radar image, is based on the set of shifts of the radar image that is iterated until a termination condition is met; and an output interface rendering the radar image from the updated estimate of the radar image.

17. The radar system of claim 16, wherein an average of true positions of the set of antennas is known, such that for each iteration of the alternating optimization further includes:

aligning the estimated radar image shifts, such that an average of an estimated radar image shifts is equal to the average of the true positions of the set of antennas; and aligning the estimated radar image in a way that compensates the aligning of the estimated radar image shifts, such that, modeled measurements using the aligned radar image shifts and the aligned estimated radar image remain unchanged.

18. The radar system of claim 17, wherein an average of true positions of the set of antennas is known, such that for each iteration of the alternating optimization further includes:

aligning the estimated radar image shifts, such that an average of an estimated radar image shifts is equal to the average of the true positions of the set of antennas; and aligning the estimated radar image in a way that compensates the aligning of the estimated radar image shifts, such that, modeled measurements using the aligned radar image shifts and the aligned estimated radar image remain unchanged.

19. The radar system of claim 17, wherein the measurements of each antenna are modeled as a product of a radar operator defining the position of the antenna including the uncertainty, the radar image, and the shift of the antenna to produce modeled measurements, and wherein the hardware processor, for each iteration of the alternating optimization, is configured to
- update the estimate of the radar image by minimizing a difference between the measurements and the modeled measurements combined with a fused Lasso regularization including a one norm of the estimate of the radar image and a total variation (TV) norm of the estimate of the radar image; and
- update the determined set of shifts of the radar image by solving a sparse recovery problem minimizing a difference between the measurements and the modeled measurements with the updated estimates of the radar image combined with a one norm of each shift enforcing a single non-zero entry in the updated shift.

20. The radar system of claim 19, wherein a regularization parameter for the fused Lasso regularization is used to determine an amount of regularization required to produce a focused radar image, that includes:
- computing an upper bound on the fused Lasso regularizer using the measurements and the radar operator combined with the determined set of shifts;
- updating the regularization parameter, such that the fused Lasso regularizer is equal to the computed upper bound; and
- increasing the upper bound after a predetermined number of iterations of the alternating optimization, by using the measurements, the radar operator combined with the determined set of shifts, and a difference between the measurements and the modeled measurements.

* * * * *